United States Patent
Ayguade et al.

(10) Patent No.: US 8,561,043 B2
(45) Date of Patent: *Oct. 15, 2013

(54) DATA TRANSFER OPTIMIZED SOFTWARE CACHE FOR IRREGULAR MEMORY REFERENCES

(75) Inventors: Eduard Ayguade, Barcelona (ES); Tong Chen, Yorktown Heights, NY (US); Alexandre E. Eichenberger, Chappaqua, NY (US); Marc Gonzalez Tallada, Yorktown Heights, NY (US); Xavier Martorell, Barcelona (ES); John K. O'Brien, South Salem, NY (US); Kathryn M. O'Brien, South Salem, NY (US); Zehra N. Sura, Yorktown Heights, NY (US); Tao Zhang, Yorktown Heights, NY (US)

(73) Assignees: International Business Machines Corporation, Armonk, NY (US); Barcelona Supercomputing Center, Barcelona (ES)

( * ) Notice: Subject to any disclaimer, the term of this patent is extended or adjusted under 35 U.S.C. 154(b) by 867 days.

This patent is subject to a terminal disclaimer.

(21) Appl. No.: 12/057,456

(22) Filed: Mar. 28, 2008

(65) Prior Publication Data

US 2009/0249318 A1    Oct. 1, 2009

(51) Int. Cl.
*G06F 9/45*    (2006.01)
*G06F 12/08*    (2006.01)

(52) U.S. Cl.
USPC ............ 717/151; 717/168; 711/118; 711/125

(58) Field of Classification Search
USPC ........... 717/151, 1, 5, 168; 711/118, E12.017
See application file for complete search history.

(56) References Cited

U.S. PATENT DOCUMENTS

| | | | |
|---|---|---|---|
| 5,553,254 A | 9/1996 | Berstis et al. | |
| 6,094,702 A | 7/2000 | Williams et al. | |
| 6,549,983 B1 * | 4/2003 | Han et al. | 711/120 |
| 6,564,297 B1 * | 5/2003 | Kosche | 711/118 |
| 6,622,208 B2 | 9/2003 | North | |
| 6,950,902 B2 | 9/2005 | Sakai et al. | |
| 7,124,249 B1 | 10/2006 | Darey | |
| 7,243,195 B2 | 7/2007 | O'Brien et al. | |
| 2004/0133747 A1 | 7/2004 | Coldewey | |
| 2004/0163080 A1 | 8/2004 | Menon et al. | |
| 2004/0205307 A1 * | 10/2004 | Pullen et al. | 711/158 |

(Continued)

OTHER PUBLICATIONS

Speeding up Irregular Applications in Shared-memory Multiprocessor, Zheng Zhang, ISCA 1995, Santa Margherita Ligure italy.*

(Continued)

*Primary Examiner* — Chat Do
*Assistant Examiner* — Lynda Dinh
(74) *Attorney, Agent, or Firm* — Stephen J. Walder, Jr.; William Stock

(57) ABSTRACT

Mechanisms are provided for optimizing irregular memory references in computer code. These mechanisms may parse the computer code to identify memory references in the computer code. These mechanisms may further classify the memory references in the computer code as either regular memory references or irregular memory references. Moreover, the mechanisms may transform the computer code, by a compiler, to generate transformed computer code in which irregular memory references access a storage of a software cache of a data processing system through a transactional cache mechanism of the software cache.

18 Claims, 10 Drawing Sheets

(56) References Cited

U.S. PATENT DOCUMENTS

Figure 1:
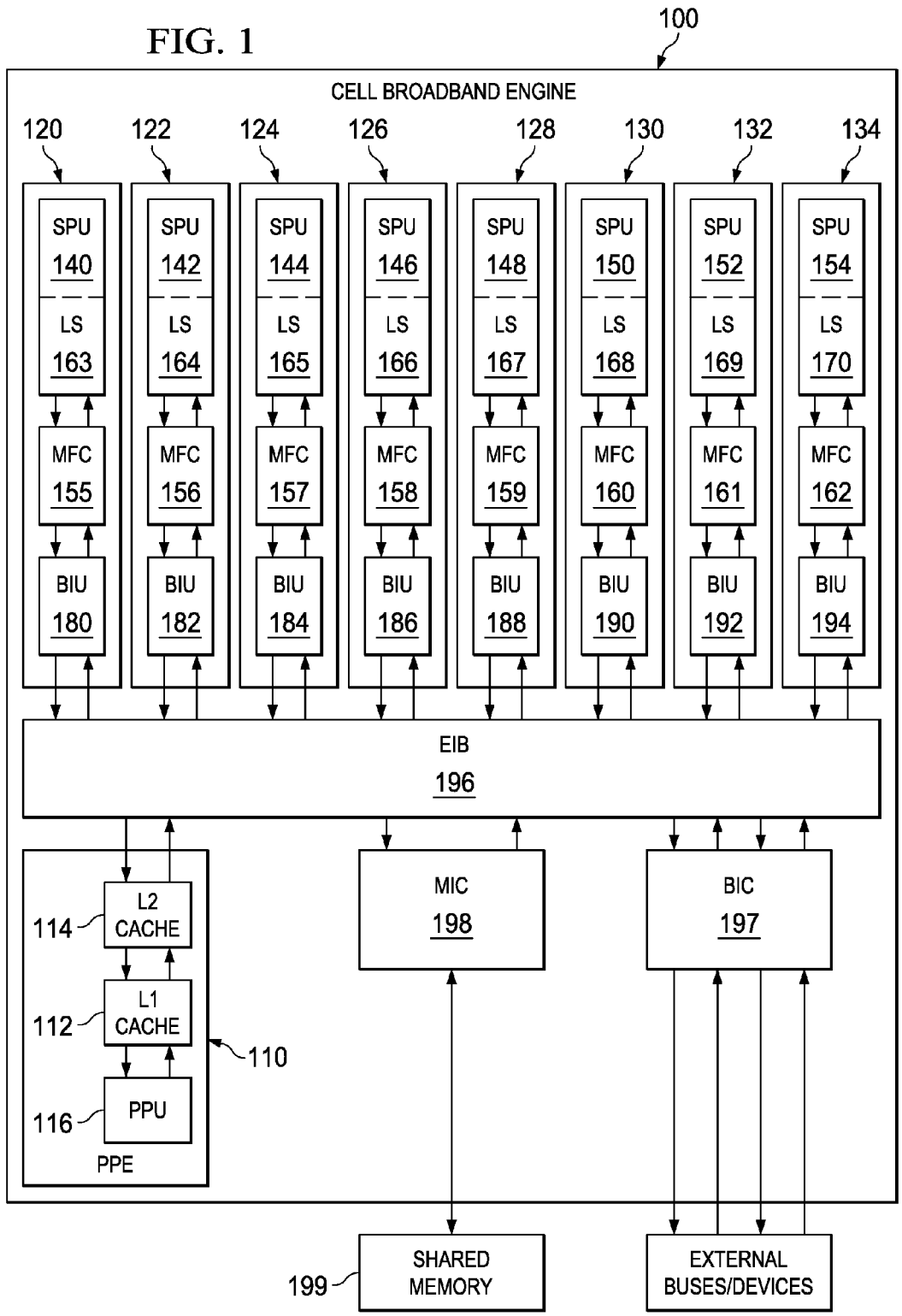

| | | | |
|---|---|---|---|
| 2005/0081107 | A1 | 4/2005 | DeWitt, Jr. et al. |
| 2005/0086653 | A1 | 4/2005 | Heishi et al. |
| 2006/0080372 | A1 | 4/2006 | Barua et al. |
| 2006/0112237 | A1 | 5/2006 | Chen et al. |
| 2006/0212440 | A1 | 9/2006 | Heishi et al. |
| 2006/0265568 | A1* | 11/2006 | Burton .................. 711/216 |
| 2007/0260846 | A1 | 11/2007 | Burton |
| 2007/0261042 | A1 | 11/2007 | Chen et al. |
| 2007/0283098 | A1 | 12/2007 | O'Brien et al. |
| 2009/0158248 | A1* | 6/2009 | Linderman et al. .......... 717/106 |
| 2009/0248985 | A1 | 10/2009 | Ayguade et al. |
| 2010/0088673 | A1 | 4/2010 | Chen et al. |

OTHER PUBLICATIONS

Antonio González (A Data Cache with Multiple Caching Strategies Tuned to Different Types of Locality, ACM 1995 International Conference on Supercomputing, Barcelona, Spain, ISBN: 0-89791-728-6, pp. 338-347.*

Balart, Jairo et al., "A Novel Asynchronous Software Cache Implementation for the Cell-BE Processor", Proceedings of the Languages and Compilers for Parallel Computing, 20th International Workshop, LCPC 2007, Oct. 11-13, 2007, pp. 125-140.

Gonzalez, Marc et al., "Hybrid Access-Specific Software Cache Techniques for the Cell BE Architecture", Proceedings of the Seventeenth International Conference on Parallel Architectures and Compilation Techniques (PACT'08), Toronto, Canada, Oct. 25-29, 2008, 11 pages.

U.S. Appl. No. 12/246,602, filed Oct. 7, 2008, Chen, Tong et al.

Miller et al., "Software-based Instruction Caching for Embedded Processors", ACM, ASPLOS'06, Oct. 21-25, 2006, pp. 293-302.

Witchel et al., "Direct Addressed Caches for Reduced Power Consumption", 34th Annual International Symposium on Microarchitecture, MICRO-34, Austin, Texas, Dec. 2001, 11 pages.

Moritz et al., "Hot Pages: Software Caching for Raw Microprocessors", MIT-LCS Technical Memo LCS-TM-599, Aug. 1999, 12 pages.

Fryman et al., "SoftCache: A Technique for Power and Area Reduction in Embedded Systems", GTech Tech Report GIT-CERCS-03-06, 12 pages.

Jacob et al., "Software-Managed Address Translation", IEEE, Proceedings of the Third International Symposium on High Performance Computer Architecture, Feb. 1-5, 1997, 12 pages.

Eichenberger et al., "Using advanced compiler technology to exploit the performance of the Cell Broadband Engine architecture", IBM Systems Journal, vol. 45, No. 1, 2006, pp. 59-84.

U.S. Appl. No. 12/057,447, filed Mar. 28, 2008, Ayguade et al.
U.S. Appl. No. 12/057,447.
U.S. Appl. No. 12/246,602.
Final Office Action mailed Jan. 3, 2012 for U.S. Appl. No. 12/057,447, 32 pages.
Response to Office Action filed with the USPTO on Oct. 20, 2011 for U.S. Appl. No. 12/057,447, 25 pages.
Response to Office Action filed with the USPTO on Nov. 3, 2011 for U.S. Appl. No. 12/246,602, 24 pages.
Advisor Action mailed Mar. 19, 2012 for U.S. Appl. No. 12/057,447, 5 pages.
Advisory Action mailed Mar. 28, 2012 for U.S. Appl. No. 12/246,602, 5 pages.
Final Office Action mailed Jan. 19, 2012 for U.S. Appl. No. 12/246,602, 27 pages.
Interview Summary mailed Mar. 5, 2012 for U.S. Appl. No. 12/057,447, 3 pages.
Interview Summary mailed Mar. 5, 2012 for U.S. Appl. No. 12/246,602, 3 pages.
Response to Final Office Action filed with the USPTO on Mar. 2, 2012 for U.S. Appl. No. 12/057,447, 27 pages.
Response to Final Office Action filed with the USPTO on Mar. 19, 2012 for U.S. Appl. No. 12/246,602, 29 pages.
Al-Sukhni, Hassan F., "Identifying and Exploiting Memory Access Characteristics for Prefetching Linked Data Structures", Thesis submitted to the Faculty of the Graduate School of the University of Colorado, 2006. 9 pages.
Office Action mailed Jun. 7, 2012 for U.S. Appl. No. 12/057,447; 31 pages.
Office Action mailed Jun. 26, 2012 for U.S. Appl. No. 12/246,602; 21 pages.
Final Office Action dated Nov. 20, 2012 for U.S. Appl. No. 12/057,447; 28 pages.
Final Office Action mailed Dec. 4, 2012 for U.S. Appl. No. 12/246,602, 21 pages.
Respone to Office Action filed with the USPTO Sep. 7, 2012 for U.S. Appl. No. 12/057,447; 31 pages.
Response to Office Action filed with the USPTO on Sep. 26, 2012 for U.S. Appl. No. 12/246,602, 26 pages.
Appeal Brief filed with the USPTO on Apr. 1, 2013 for U.S. Appl. No. 12/057,447, 41 pages.
Appeal Brief filed with the USPTO on Apr. 24, 2013 for U.S. Appl. No. 12/246,602, 35 pages.
Notice of Allowance mailed Apr. 29, 2013 for U.S. Appl. No. 12/057,447, 13 pages.
Notice of Allowance mailed Jun. 7, 2013 for U.S. Appl. No. 12/246,602, 14 pages.

* cited by examiner

DATA TRANSFER OPTIMIZED SOFTWARE CACHE FOR IRREGULAR MEMORY REFERENCES

BACKGROUND OF THE INVENTION

1. Field of the Invention

The present application relates generally to an improved data processing apparatus and method and more specifically to an apparatus and method for providing a data transfer optimized software cache for irregular memory references.

2. Background of the Invention

Many emerging computer architectures are deploying application specific processors to address acceleration of targeted applications. Frequently, such systems include novel memory hierarchies which can be hard coded an optimized to produce high performance. The Cell Broadband Engine (CBE) processor, available from International Business Machines Corporation of Armonk, N.Y., is one of the recent chip multiprocessor architectures with very specific features, such as its heterogeneous computing units and its memory model.

The CBE architecture comprises nine processing cores on a single chip. These nine processing cores include one 64-bit Power Processing Element (PPE core) and eight Synergistic Processing Elements (SPE cores) that use 18-bit addresses to access a 256K local store. The PPE core accesses system memory using a cache-coherent memory hierarchy. The SPE cores access system memory via a Direct Memory Access (DMA) engine connected to a high bandwidth bus, relying on software to explicitly initiate DMA requests for data transfer. The bus interface allows issuing asynchronous DMA transfer requests and provides synchronization calls to check or wait for previously issued DMA requests to complete.

BRIEF SUMMARY OF THE INVENTION

In one illustrative embodiment, a method, in a data processing system, is provided for optimizing irregular memory references in computer code. The method may comprise parsing the computer code to identify memory references in the computer code. The method may further comprise classifying the memory references in the computer code as either regular memory references or irregular memory references. Accesses to a software cache by regular memory references may be controlled by a high locality cache mechanism. Accesses to a software cache by irregular memory references may be controlled by a transaction cache mechanism. Moreover, the method may comprise transforming the computer code, by a compiler, to generate transformed computer code in which irregular memory references access a storage of the software cache of the data processing system through the transactional cache mechanism of the software cache.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an exemplary block diagram of a Cell Broadband Engine architecture in accordance with one illustrative embodiment;

FIG. 2 is an example of a portion of code and its transformation for ensuring proper access of a distributed memory architecture;

FIG. 3 is an exemplary block diagram of an overall software cache design architecture in accordance with one illustrative embodiment;

FIG. 4 is an exemplary block diagram of the high locality cache of the software cache design in accordance with one illustrative embodiment;

FIGS. 5A and 5B are a flowchart outlining an exemplary operation of a high locality cache in accordance with one illustrative embodiment;

FIG. 6 is an exemplary block diagram of a transactional cache in accordance with one illustrative embodiment;

FIGS. 7A and 7B are a flowchart outlining an exemplary operation of a transactional cache in accordance with one illustrative embodiment;

FIG. 8 is an exemplary diagram of an executable code generation by a compiler in accordance with one illustrative embodiment;

FIG. 9 is an exemplary diagram illustrating how the transactional cache structures are modified along one iteration of the unrolled loop of FIG. 8; and FIG. 10 is a flowchart outlining an exemplary operation of a compiler in accordance with one illustrative embodiment.

DETAILED DESCRIPTION OF THE INVENTION

As discussed above, the Cell Broadband Engine (CBE) processor is one of the recent chip multiprocessor architectures with application specific processor features. Moreover, as mentioned above, in the CBE processor architecture, software is responsible for initiating DMA transfers. In so doing, the software is further responsible for ensuring memory consistency and proper address translation.

In an architecture where software is responsible for data transfers, memory consistency, and address translation, the performance of the system is very sensitive to the compiler technology. The compiler has to address performance in three specific areas. First, each memory reference has to be monitored to ensure correct translation from a global address space to a local store address space. This monitoring code represents an overhead and thus, it is important to minimize the impact of this monitoring code on the performance of the system. Second, communication must be scheduled to minimize the cost of data transfers. Thus, the ability to overlap computation with communication becomes an attractive optimization. Third, memory consistency must be maintained by software which again is an important source of overhead that needs to be addressed.

In order to address these various areas of potential performance degradation, it is not possible to rely entirely on the compiler for optimization. The runtime system must also ease the compiler's job by including the necessary capabilities to enhance the chances for optimization. The illustrative embodiments set forth herein provide software caching mechanisms that provide a number of contributions for addressing these issues with regard to programmability of processors having distributed memory architectures, such as the CBE processor architecture.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In order to understand the advances provided by the mechanisms of the illustrative embodiments, it is first important to understand a representative distribute memory architecture in which the mechanisms of the illustrative embodiments may be implemented. Thus, FIG. 1 is provided as an exemplary block diagram of a data processing system in which aspects of the illustrative embodiments may be implemented. The exemplary data processing system shown in FIG. 1 is an example of the Cell Broadband Engine (CBE) data processing system. While the CBE will be used in the description of the illustrative embodiments of the present invention, the present invention is not limited to such, as will be readily apparent to those of ordinary skill in the art upon reading the following description. The mechanisms of the illustrative embodiments may be applied to any distributed memory architecture and are not limited to use with the CBE processor architecture.

As shown in FIG. 1, the CBE 100 includes a power processor element (PPE) 110 having a processor (PPU) 116 and its L1 and L2 caches 112 and 114, and multiple synergistic processor elements (SPEs) 120-134 that each has its own synergistic processor unit (SPU) 140-154, memory flow control 155-162, local memory or store (LS) 163-170, and bus interface unit (BIU unit) 180-194 which may be, for example, a combination direct memory access (DMA), memory management unit (MMU), and bus interface unit. A high bandwidth internal element interconnect bus (EIB) 196, a bus interface controller (BIC) 197, and a memory interface controller (MIC) 198 are also provided.

The local memory or local store (LS) 163-170 is a non-coherent addressable portion of a large memory map which, physically, may be provided as small memories coupled to the SPUs 140-154. The local stores 163-170 may be mapped to different address spaces. These address regions are continuous in a non-aliased configuration. A local store 163-170 is associated with its corresponding SPU 140-154 and SPE 120-134 by its address location, such as via the SPU Identification Register, described in greater detail hereafter. Any resource in the system has the ability to read/write from/to the local store 163-170 as long as the local store is not placed in a secure mode of operation, in which case only its associated SPU may access the local store 163-170 or a designated secured portion of the local store 163-170.

The CBE 100 may be a system-on-a-chip such that each of the elements depicted in FIG. 1 may be provided on a single microprocessor chip. Moreover, the CBE 100 is a heterogeneous processing environment in which each of the SPUs may receive different instructions from each of the other SPUs in the system. Moreover, the instruction set for the SPUs is different from that of the PPU, e.g., the PPU may execute Reduced Instruction Set Computer (RISC) based instructions while the SPU execute vectorized instructions.

The SPEs 120-134 are coupled to each other and to the L2 cache 114 via the EIB 196. In addition, the SPEs 120-134 are coupled to MIC 198 and BIC 197 via the EIB 196. The MIC 198 provides a communication interface to shared memory 199. The BIC 197 provides a communication interface between the CBE 100 and other external buses and devices.

The PPE 110 is a dual threaded PPE 110. The combination of this dual threaded PPE 110 and the eight SPEs 120-134 makes the CBE 100 capable of handling 10 simultaneous threads and over 128 outstanding memory requests. The PPE 110 acts as a controller for the other eight SPEs 120-134 which handle most of the computational workload. The PPE 110 may be used to run conventional operating systems while the SPEs 120-134 perform vectorized floating point code execution, for example.

The SPEs 120-134 comprise a synergistic processing unit (SPU) 140-154, memory flow control units 155-162, local memory or store 163-170, and an interface unit 180-194. The local memory or store 163-170, in one exemplary embodiment, comprises a 256 KB instruction and data memory which is visible to the PPE 110 and can be addressed directly by software.

The PPE 110 may load the SPEs 120-134 with small programs or threads, chaining the SPEs together to handle each step in a complex operation. For example, a set-top box incorporating the CBE 100 may load programs for reading a DVD, video and audio decoding, and display, and the data would be passed off from SPE to SPE until it finally ended up on the output display. At 4 GHz, each SPE 120-134 gives a theoretical 32 GFLOPS of performance with the PPE 110 having a similar level of performance.

The memory flow control units (MFCs) 155-162 serve as an interface for an SPU to the rest of the system and other elements. The MFCs 155-162 provide the primary mechanism for data transfer, protection, and synchronization between main storage and the local storages 163-170. There is logically an MFC for each SPU in a processor. Some implementations can share resources of a single MFC between multiple SPUs. In such a case, all the facilities and commands defined for the MFC must appear independent to software for each SPU. The effects of sharing an MFC are limited to implementation-dependent facilities and commands.

As mentioned above, in distributed memory architectures, such as the Cell Broadband Engine architecture illustrated in FIG. 1 above, software is primarily used to monitor memory references, schedule data transfers, and the like, to transparently manage the distributed memory architecture. Because of this software dependency, relatively simple source code that accesses the distributed memory architectures is transformed into more complex code that includes a large amount of checking and management code for checking correct performance of, and managing, accesses to the distributed memory architecture. This checking and management code represents a large amount of overhead that degrades the performance of the system as a whole.

For example, in distributed memory architectures, such as the CBE 100, there is very little if any hardware support to supply the data referenced in load/store operations and thus, every memory reference in the code executed in association with the distributed memory architecture is surrounded by checking code to ensure correctness in the memory access. Some checking code is devoted to checking if the required data is already in the cache storage, hereafter referred to as the "look-up" code. In case the look-up code determines that the data is not in the cache storage, i.e. a cache miss occurs, other code is executed that is devoted to determining the placement of the new data about to be brought into the cache storage, hereafter referred to as the "placement" code. Because of the space limitation in the cache storage, other code is introduced in order to send back to main memory the modified data no longer required by the computation.

Moreover, control information, e.g., dirty bits and the like, is utilized to keep track of what data has been modified and additional code is used to update this control information, hereafter referred to as "consistency" code. Furthermore, code for performing Direct Memory Access (DMA) operations is introduced to bring in data in into the cache storage and to send back data to the main memory, hereafter referred to as "communication" code.

Using the CBE 100 as an example of a distributed memory architecture, because of the local address space in local stores 163-170 of the SPEs 120-134, code is used to translate from the global address space to the local address space of the SPE 120-134, hereafter referred to as "translation" code. Finally, code for synchronizing with the DMA engine is used to ensure that the data transfers are completed and the memory accesses can be safely executed, hereafter referred to as "synchronization" code.

Figure 2:
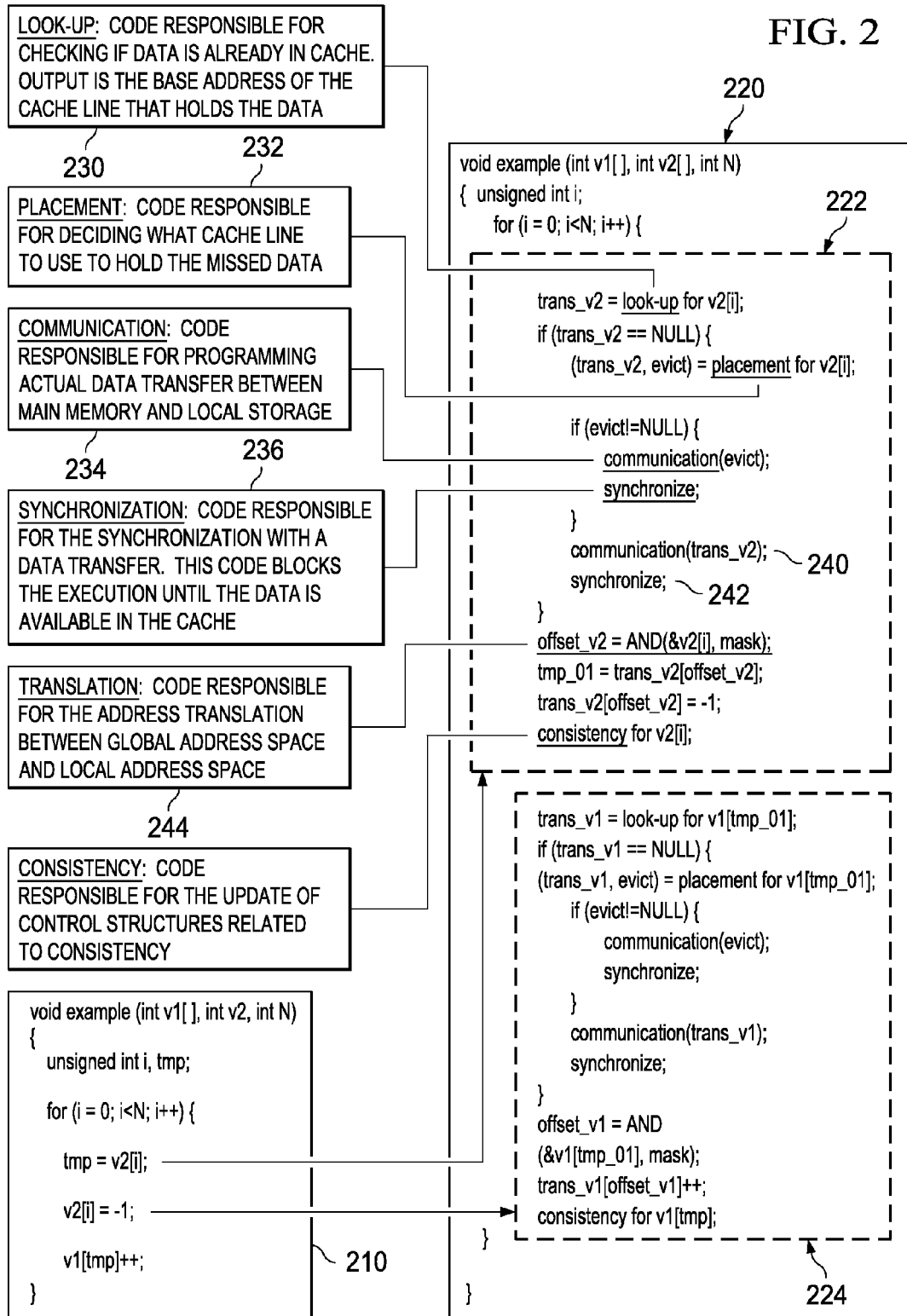

FIG. 2 is an example of a portion of code and its transformation for ensuring proper access of a distributed memory architecture. As shown in FIG. 2, a portion of C code 210 to be executed by an SPE is transformed, by a compiler (not shown), into transformed code 220 to correctly address each memory reference. The difference in code 210 and transformed code 220 illustrates the difficulty for a compiler to generate efficient code.

As shown in FIG. 2, the original code 210 has two different memory references v1[*tmp*] and v2[*i*]. In the transformed code 220, two boxes 222 and 224 are shown to illustrate the corresponding portions of the transformed code 220 with the two memory references. Box 222 corresponds to the v2[*i*] memory reference in the loop body of the original code 210 and box 224 corresponds to the v1[*tmp*] memory reference in the loop body of the original code 210.

Looking at the memory reference v2[*i*] in box 222, an if statement has been inserted in the transformed code 220 where the look-up code 230 determines the condition of the if statement. In case a cache miss occurs (trans_v2 equals NULL), the placement code 232 is executed and variable trans_v2 is updated with the base address of a cache line to where the recently missed data has been mapped. In case some data has to be sent back to main memory, the variable evict holds the base address of the cache line to be evicted. Another if statement controls the eviction event and the corresponding communication code 234 and synchronization code 236 is executed. Then additional communication code 240 and synchronization code 242 is executed to actually bring the data that was missed into the cache.

Finally, translation code 244 is provided that is composed of two computations. The first is a computation to determine the offset within the cache line and the second is code to add the offset to the cache line base address. Similar look-up, placement, communication, synchronization, and translation code has been introduced into the translated code 220 for the v1[*tmp*] memory reference as well, as shown in box 224.

The transformation of the original code 210 into the transformed code 220 in FIG. 2 is clearly not optimal in a number of different ways. First, the code transformation does not take into account the different locality that the two memory references are exposing. On one side, the v2[*i*] reference shows excellent spatial locality, i.e. memory locations close to each other, such as in the same cache line, are likely to be accessed. Memory accesses or references, such as v2[*i*] in the depicted example, that have a high degree of spatial locality are referred to herein as "regular" memory accesses or references. Such regular memory accesses or references may be characterized by having a constant stride, i.e. a constant number of locations in memory between successive elements, within a loop execution. Thus, "regular" memory accesses or references may be any memory reference in code that explicitly shows a strided access pattern at compile time (although the stride value itself need not be necessarily known at compile time).

Software caching techniques are a reliable solution for handling such regular memory references to achieve an efficient code. However, it would be desirable to remove some, if not all, the control code that surrounds a regular memory reference, e.g., the v2[*i*] memory reference, by predicting the exact iteration where this memory access is going to cause a cache miss. For example, given the initial address of a memory access, the stride and the cache line size, it can be predicted how many iterations may be performed without having a cache miss. If it is known when a cache miss is going to be produced, one can execute the control code just for cache misses, i.e. at a cache line level, rather than for each iteration of a regular memory reference.

Thus, it would be desirable to have a code transformation that executes the control code at a cache line level, rather than a memory access level, so that this predictability may be exploited and used to optimize the control code. An immediate consequence of this, however, is that a configurable cache line size may be used so as to identify the largest cache line size that minimizes the execution of the control code. Moreover, since cache misses may not occur at the same iteration for every memory access in a computation, it is further desirable to have a mechanism to pin the cache lines in the cache storage until they are no longer in use by any memory reference, thereby excluding these cache lines from the cache's replacement policy.

On another side, the memory access to v1[*tmp*] does not expose any locality, i.e. there is no guarantee that v1[*x*] is local in memory to v1[*y*]; there is no constant stride between successive v1 elements. Memory accesses or memory references that do not expose any locality are referred to herein as "irregular" memory accesses or references, i.e. memory accesses or memory references that are not "regular" memory accesses or references are considered "irregular" memory accesses or references. For irregular memory accesses or references, it is reasonable to accept that the control code is going to be present at every iteration of a memory access/reference. However, depending on specific features in the software cache design, some optimizations may be done. First, it is not acceptable that the cache line size for this memory access/reference type is similar to the one used in the v2[*i*] access. This is because the cache line size determines the amount of transferred data for a cache miss. If a very small element in the cache line is actually referenced, the ratio between the amount of transferred data and used data is very poor. Thus, it would be desirable to adapt the amount of transferred data according to the type of memory access, e.g., use a relatively small cache line size for memory references that do not expose locality and use a relatively larger cache line size for those memory reference that do expose locality. As will be described hereafter, the illustrative embodiments achieve such adaptability by permitting the compiler to determine where to map a memory reference with a high locality cache using a relatively larger cache line size and a transactional cache using a relatively smaller cache line size.

Second, the code transformation in FIG. 2 always forces an immediate synchronization between the execution flow and the programmed data transfers. This hinders any possible overlapping between computation and communication. The compiler should be allowed to reorganize the computation to maximize the chances for the overlapping of computation with communication. Such reorganization should try to group all the look-up, placement, and communication code and place it as far as possible from the actual use of the data and the synchronization before the data is used. However, it should be ensured that no possible conflict appears between the different placement actions. In this way, such reorganization makes control code overlap with data transfers originated in the control code.

The illustrative embodiments provide mechanisms for facilitating such transformations for the generation of efficient code for both types of memory access or references, i.e. regular and irregular memory accesses or references. The mechanisms of the illustrative embodiments provide a software cache design that is non-uniform with respect to how memory accesses/references are treated. The software cache design includes separate facilities for handling regular memory accesses or references and irregular memory accesses or references with these facilities being selectively utilized to handle the memory access/reference. A compiler or other entity involved in optimizing and generating executable code for one or more processors of a system implementing the software cache design of the illustrative embodiments, may take advantage of the mechanisms of the software cache design when optimizing and generating the executable code.

Figure 3:
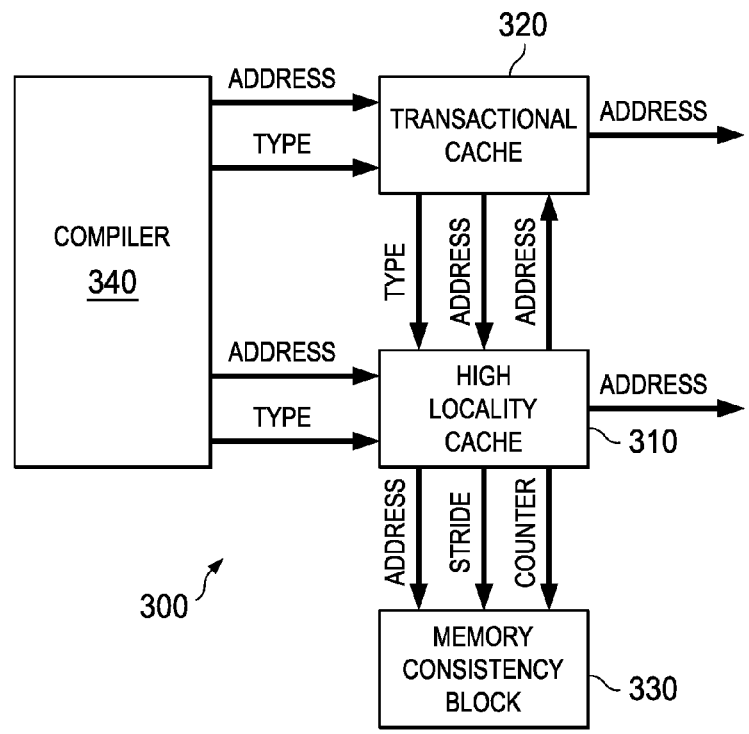

FIG. 3 is an exemplary block diagram of an overall software cache design architecture in accordance with one illustrative embodiment. As shown in FIG. 3, the software cache design 300 comprises three primary operational elements referred to as the high locality cache 310, the transactional cache 320, and the memory consistency engine 330. The high locality cache 310 is used to handle memory accesses/references identified by the compiler 340 as regular memory accesses/references. The transactional cache 320 is used to handle memory accesses/references identified by the compiler 340 as irregular memory accesses/references. The memory consistency engine 330 implements the necessary data structures to keep a relaxed consistency model. The compiler 340 operates to parse original computer code to identify memory accesses/references and classify them as regular or irregular memory accesses/references and inject control code for directing memory accesses/references to one of the high locality cache 310 or the transactional cache 320, as discussed in greater detail hereafter.

Depending on the locality that a memory access/reference exhibits, the software cache design implementation selects a specific mechanism to treat the memory access/reference. For example, regular memory references may be mapped to the high locality cache 310 while irregular memory accesses/references may be mapped to the transactional cache 320. The actual mapping or selection of whether to utilize the high locality cache 310 or the transactional cache 320 may be performed, for example, by the compiler 340, such as by injecting explicit control code into the original code to direct software cache access through one of the high locality cache 310 or the transactional cache 320, in response to encountering the memory access/reference. The compiler 340 may execute on the PPU or an SPU, for example, and may provide code to the same or different SPU for execution.

As shown in FIG. 3, in response to a memory access/reference, the compiler 340 submits an address and data type associated with the memory access/reference to a selected one of the high locality cache 310 or the transactional cache 320. For every memory reference in code being handled by the compiler 340, the compiler 340 decides which path to follow to access the cache state or structures. If the memory reference corresponds to a regular memory reference, then the compiler emits control code causing the memory reference to use the path through the high locality cache 310 to access software cache structures. If the memory reference corresponds to an irregular memory reference, then control code emitted by the compiler causes to the memory reference to access the software cache structures through the transaction cache.

The software cache design 300 supports a relaxed consistency. The memory consistency engine 330 is responsible for maintaining the memory consistency of the virtual memory, or in some cases real system memory, of the system, but some interaction exists between the high locality cache 310. The interaction between the high locality cache 310 and the memory consistency engine 330 comprises identifying what parts of a cache line have been modified by a memory access/reference and triggering write-back operations.

In particular, every time a cache line miss occurs in the high locality cache 310, as discussed hereafter, the high locality cache 310 informs the memory consistency engine 330 of which elements in the cache line are going to be modified. This is possible since only regular memory references are mapped to the high locality cache 310 by the compiler 340.

The write-back operation is executed whenever a cache line is no longer referenced by regular memory references, e.g., when a reference counter of a cache line in the high locality cache 310 equals zero, as discussed hereafter Thus, for any one memory access/reference, the software cache is accessed through only one of the high locality cache or the transactional cache, again depending upon the determined locality of the memory access/reference. The high locality cache and transactional cache are consistent with each other with accessing of these caches being done by defining an address of the cache line in the cache storage. This hybrid approach to handling regular and irregular memory accesses/references is hierarchical in the sense that only the transactional cache is forced to check for the data in the high locality cache storage within a look-up process.

Figure 4:
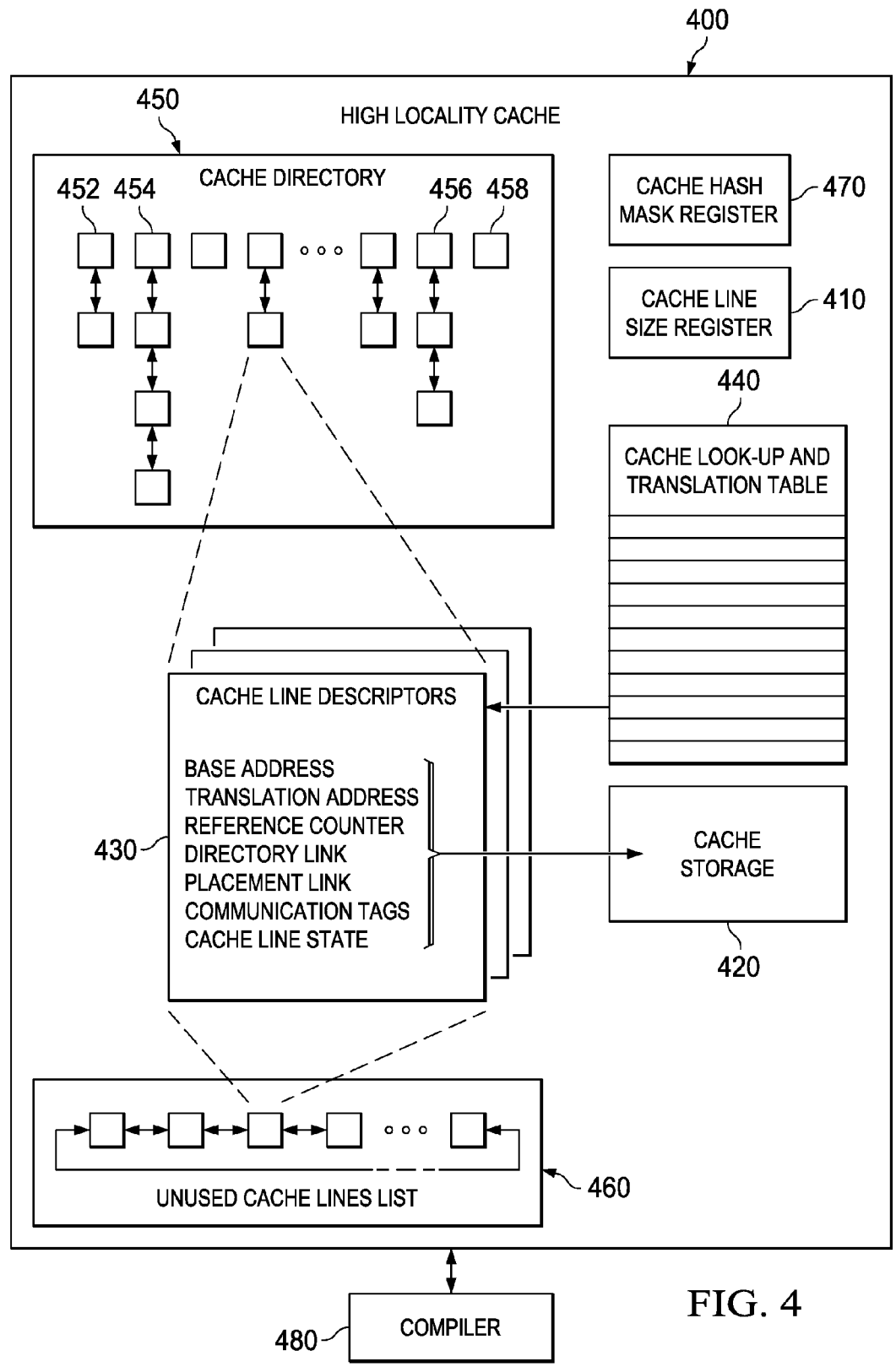

FIG. 4 is an exemplary block diagram of the high locality cache of the software cache design in accordance with one illustrative embodiment. The high locality cache 400 is designed to handle memory accesses/references that expose a high degree of spatial locality, i.e. regular memory accesses/references. The high locality cache 400 is designed to deliver acceptable hit/miss ratios, maximizing the overlapping between computation and communication. In one embodiment, the high locality cache 400 is fully associative and has a configurable cache line size. In another embodiment, the high locality cache 400 has a set associativity that is sufficiently high for the type of loop processed. Namely, in such an embodiment, a cache with a set associativity of SA can process any loops in which the number of references is smaller than SA.

As shown in FIG. 4, the high locality cache 400 comprises a cache line size register 410, a cache storage 420, a cache line descriptor 430, a cache look-up and translation table 440, a cache directory 450, an unused cache lines list 460, and a cache hash mask register 470. The cache line size register 410 and cache hash mask register 470 are software registers that store data representing a cache line size and a cache hash mask value, respectively. The cache storage 420 is a storage device, such as a memory, in which data that may be the subject of memory accesses/references may be located or moved into in response to a cache miss occurring. The other elements 430-450 and 460 may be data structures stored in registers, memories, or the like, associated with the high locality cache 400. These elements 410-470 may be utilized by a compiler 480 when handling regular memory accesses/references in source code for generating executable code for execution by an associated processor implementing the software cache design. This compiler 480 may be the compiler 340 in FIG. 3, for example.

In one illustrative embodiment, the cache line size register 410 stores an unsigned integer value describing the size of the cache line (L). For example, this value may be a power of 2 and can range between 1024 and 4096.

The cache storage 420, in one illustrative embodiment, may be dimensioned to 64 Kb and may be organized as N cache lines, where the value of N depends on the value stored in the cache line size register 410. For example, the value for N may be computed by dividing the total cache storage, e.g., 64×1024 bytes, by the value in the cache line size register 410. Therefore, in one illustrative embodiment, the cache storage 420 may store from 16 up to 128 cache lines.

The cache line descriptor 430 is a data structure that stores control information associated with a cache line. There are as many cache line descriptors 430 as cache lines that can be stored in the cache storage 420. In one illustrative embodiment, the cache storage 420 may store up to 128 cache lines and thus, there are a corresponding 128 cache line descriptors

430. In one illustrative embodiment, each of these cache line descriptors 430, as shown in FIG. 4, includes such information as the base address, translation address, reference counter, directory link, placement link, cache line state, and communication tags.

The base address is the base address of the cache line in main memory of the system, e.g., shared memory 199 in FIG. 1. The translation address is the base address of the cache line in the cache storage 420 to where the cache line in main memory has been mapped. The cache line state describes whether or not the cache line stores modified data or not. The reference counter is an integer value that keeps track of how many regular references are referencing the cache line. The directory link is a pair of addresses pointing to the previous and next cache line descriptors in the list of the cache directory 450. The placement link is a pair of addresses pointing to the previous and next entries in the unused cache lines list 460 in the case of the cache line being placed in the unused cache lines list 460.

The communication tags are a pair of integer values, which in one illustrative embodiment have a range of [0 . . . 31], that are interpreted as the tags used in DMA operations for bringing the cache line into the cache storage 420 and for evicting the cache line. Taking the Cell Broadband Engine as an example of a distribute memory architecture, as noted above, the memory flow controller is responsible for all data transfers between the SPE local store and the main memory, i.e. shared memory 199 in FIG. 1. The memory flow controller (MFC), in one implementation, supports 16 concurrent asynchronous requests of up to 16 Kb that are programmed through a DMA engine. DMA operations are identified by a DMA tag which may be an integer value from 0 to 31 that allows the application's code to track the status of the DMA operations. In order to synchronize with the DMA transfers, the MFC interface provides synchronization services that check or wait for previously issued DMA requests to complete. The MFC optimally schedules all DMA operations and is allowed to change the order the DMA operations are completed.

It is possible to explicitly indicate that a group of specific DMA operations have to be serialized. The MFC interface includes services to program "fenced" DMA transfers, i.e. DMA transfers whose order cannot be changed. Among all DMA operations holding the same DMA tag, fenced DMA operations are never reorganized, they never get executed before any prior DMA, nor are they executed after a later DMA. Thus, with regard to the software cache design of the illustrative embodiments, the communication tags in the cache line descriptors 430 store these DMA tags which may be used by the MFC interface.

The cache look-up and translation table 440 stores information for a look-up process and a translation process. Each row in the cache look-up and translation table 440 is assigned to a memory reference. In one illustrative embodiment, each row in the table contains three values used for the look-up and translation code, i.e. the base address of the cache line in the global address space, the base address of the cache line in the cache storage 420 address space, and a pointer to the cache line descriptor 430 being referenced by the regular memory reference. In another embodiment, the values kept from the look-up and translation code can be kept directly in hardware registers or in some other memory location such as local data on the stack of the current function.

The cache directory 450, in one illustrative embodiment, is comprised of a plurality of double linked lists 452-458, with no limitation on the number of cache lines that can be placed in any of the lists 452-458. In one illustrative embodiment, the cache directory 450 is composed of 128 double-linked lists 452-458. A hash function may be applied to the base address of a cache line in main memory and the output of this hash function is an identifier of one of the double-linked lists 452-458. The double-linked lists 452-458 are used as a hash structure to speed up the look-up process, smoothing its impact on performance of the system and making possible the use of a fully associative software cache scheme. While double-linked lists are used in the illustrative embodiments, other mechanisms may be used for facilitating this hash look-up operation as will be apparent to those of ordinary skill in the art. For example, rather than using a double linked list, a single linked list may be utilized.

The cache unused lines list 460 is a list where cache line descriptors are placed when the cache line associated with the descriptor is no longer referenced by any regular memory reference. In one illustrative embodiment, the cache unused lines list 460 is a double-linked list that supports referencing to the first and last entries in the list. A reference counter for each cache line to maintain information identifying whether a cache line is being referenced by a regular memory reference. For example, a code transformation may be defined by the compiler that ensures that the reference counter is incremented/decremented whenever a memory reference no longer uses a cache line or recently starts references a cache line, e.g. a regular memory reference is changing a cache line. If this reference counter reaches zero, then no regular memory references are referencing this cache line.

The cache hash mask register 470 stores an value used as a mask for identifying a list in the cache directory 450 in which to place a cache line descriptor 430 of a resident cache line. In one illustrative embodiment, the cache hash mask register 470 stores an unsigned integer value that operates as this mask. The operation of these elements 410-470 of the high locality cache 400 will now be described in greater detail with regard to one exemplary operational model.

An operational model of the high locality cache 400 is composed of the operations that execute upon the high locality cache structures 410-470 and implement the look-up, placement, communication, consistency, synchronization, and translation code mechanisms. The look-up operation, performed by the look-up code, is divided into two different phases. In a first phase, the look-up operation checks if an address generated by the regular memory access/reference corresponds to an entry in the cache line pointed to by the entry in the cache look-up and translation table 440 that is associated with the memory access/reference being looked-up. The entry in the cache look-up and translation table 440 is identified as corresponding to the regular memory access/reference due to the compiler having classified memory references into either regular or irregular categories and, for the regular memory references, assigning them to an integer value from 0 to a number of regular memory references minus one. This integer value is then used to associate and select a row in the cache look-up and translation table 440.

In the case where such an entry exists in the cache look-up and translation table 440, the look-up process continues checking if the generated address "falls out" from the cache line pointed out by the table entry. What is meant by the term "falls out" is that an address generated based on values stored in the cache line descriptor corresponding to the entry in the cache look-up and translation table 440, i.e. the address generated based on the base address, the translation address, and a bit mask, does not match the address of the memory reference. For example, by taking the address generated by the memory reference and masking it with a bit mask from the cache line descriptor corresponding to the entry in the cache look-up and translation table 440, the base address may be obtained which may then be compared to the base address of the cache line descriptor to determine if they match. If this is not the case, nothing else has to be done, and a cache hit is determined to have occurred. If the regular memory reference is "changing of cache line", i.e. it has been detected that the base address corresponding to the generated address in the memory reference does not match the base address in the cache lookup and translation table, then the second phase of the look-up process is executed. That is, depending on the locality that a memory operation exposes, many instances of a memory operation can generate different memory addresses (referencing different data), but all of them belonging to the same cache line. Therefore, a memory operation is "changing of cache line" when the memory address it generates belongs to a different cache line from a previous memory address generated by the memory operation. In the case where no entry in the cache look-up and translation table 440 corresponds to the address generated by the regular memory access, the look-up process also goes on to the second phase.

The second look-up phase involves the cache directory 450 being accessed and a check as to whether the referenced cache line is already resident in the cache storage 420 or not. If a cache hit occurs, i.e. the referenced cache line is already resident in the cache storage 420, then nothing else needs to be done. If a cache miss occurs, i.e. the referenced cache line is not resident in the cache storage 420, then placement and communication operations are executed.

As mentioned above, the reference counter in the cache line descriptor 430 for a particular cache line is used to keep track of how many regular references are referencing the cache line. Thus, this reference counter is incremented or decremented during the look-up process. That is, in one illustrative embodiment, the reference counter is decremented in phase one of the look-up process when a change of the cache line is detected based on the information in the cache look-up and translation table 440. That is, if the two base addresses do not match, then the regular reference has generated an address that is no longer in the same cache line that the regular reference was previously referencing. Thus, the regular memory reference is "changing of cache line". Thus, the reference counter is decremented when a regular memory reference no longer references the cache line. The incrementing of the reference counter is performed in the second phase of the look-up operation.

As mentioned above, if a cache miss occurs in the second phase of the look-up operation, a placement operation is performed by placement code. The placement code is based on the unused cache lines list 460 and the reference counters of the cache line descriptors 430. The fact that a reference counter reaches a value of zero is interpreted by the compiler as the cache line being no longer in use and thus, the cache line is a candidate for future placement/replacement operations. Whenever the reference counter of a cache line descriptor 430 has a zero value, the cache line descriptor 430 is inserted into the unused cache lines list 460. The insertion operation is done differently depending on the data in the cache line. Cache lines holding modified data, as determined from the cache line state information in the corresponding cache line descriptor 430, are inserted as the last entry in the unused cache lines list 460. Unmodified cache lines are inserted as the first entry in the unused cache lines list 460. In response to a cache miss being detected, the cache line that is replaced, via the placement code, by placement of the cache line from main memory, is the cache line associated with the first cache line descriptor 430 in the unused cache lines list 460.

As mentioned above, with regard to consistency code, the software cache operational model supports a relaxed consistency. The consistency code invokes the memory consistency engine 330 in FIG. 3 which is responsible for maintaining the memory consistency with some interaction between the high locality cache 310 and the memory consistency engine 330. Essentially, since only regular memory references are mapped to the high locality cache 310, every time a cache line miss occurs in the look-up code operation, the high locality cache 310 informs the memory consistency engine 330 about which elements in the cache line are going to be modified. Since the regular memory references are strided, given the regular memory address and its stride, it is possible to compute how many iterations (elements in the cache line) are going to be modified. This information is forwarded to the memory consistency engine 330 where appropriate data structures, e.g., dirty bits and the like, are updated to keep track of modified parts within every modified cache line.

Whenever the reference counter of a cache line is zero, and thus, the cache line descriptor 430 for that cache line is inserted into the unused cache lines list 460, a write-back operation is executed, such as by way of a code transformation where the compiler injects appropriate code to perform the write-back operation. The write-back operation is only performed for those cache lines holding modified data, as may be identified by the cache line state information in the cache line descriptor 430. In one embodiment, the write-back operation involves an asynchronous DMA program, such as may execute in each of the SPEs of the Cell Broadband Engine architecture, for evicting the cache line. The communication tag, or DMA tag, used in the write-back operation is recorded in the cache line descriptor 430 of the evicted cache line. In another embodiment, a different communication mechanism can be used, such as a messages been exchanged between processors or between processor and memory.

With regard to communication code, the software cache design of the illustrative embodiments defines that all data transfer operations are programmed asynchronously. The software cache design reserves a first portion of the DMA tags, or communication tags in the cache line descriptor 430, such as tags from 0 to 15, for data transfers that move data from main memory into the cache storage 420. A second portion of the tags, e.g., tags 16 to 31, are reserved for data transfers moving data from the cache storage 420 to main memory. In both cases tags are assigned in a circular manner. Tags used in the communication code operations are recorded in the communication tags information of the cache line descriptor 430 for the particular cache line.

Regarding synchronization code, the software cache design of the illustrative embodiments records every communication tag used in any communication operation in the communication tag information of the cache line descriptors 430. Thus, the synchronization operation is supported by the data in the communication tag information of the cache line descriptors 430. It is sufficient to recover the communication tags associated with each cache line to synchronize and check that any pending data transfer of the cache line has completed. For example, in the SPE architecture of the Cell Broadband Engine, there are specific instructions in the SPE instruction architecture for synchronizing and checking that pending data transfers of a cache line have completed using DMA tags. Such mechanisms may be used to synchronize and check pending data transfers using the communication tags of the illustrative embodiments. In another embodiment, explicit synchronization primitives are used instead of the DMA tags. An array of synchronization variables is provided, and whenever a DMA command is performed using a given tag X in the prior embodiment, this alternative embodiment may first synchronize using the Xth synchronization variable in the given array of synchronization. Those skilled in the art would also understand that a more coarse, or possibly even a finer, synchronization scheme is also possible.

With regard to translation code, the cache look-up and translation table 440 contains an entry for the memory access/reference requiring the translation. This entry points to a cache line descriptor 430 where all the necessary data for the translation is available, i.e. base address and translation address. The translation code operation is composed of several arithmetic computations. The offset in the cache line being reference is computed by an AND operation, using the value in the cache line size register 410, e.g., base address AND (cache line size register-1). The offset is added to the translation address in the cache line descriptor 430 to identify the portion of the cache line referenced by the memory access/reference.

Figure 5A:
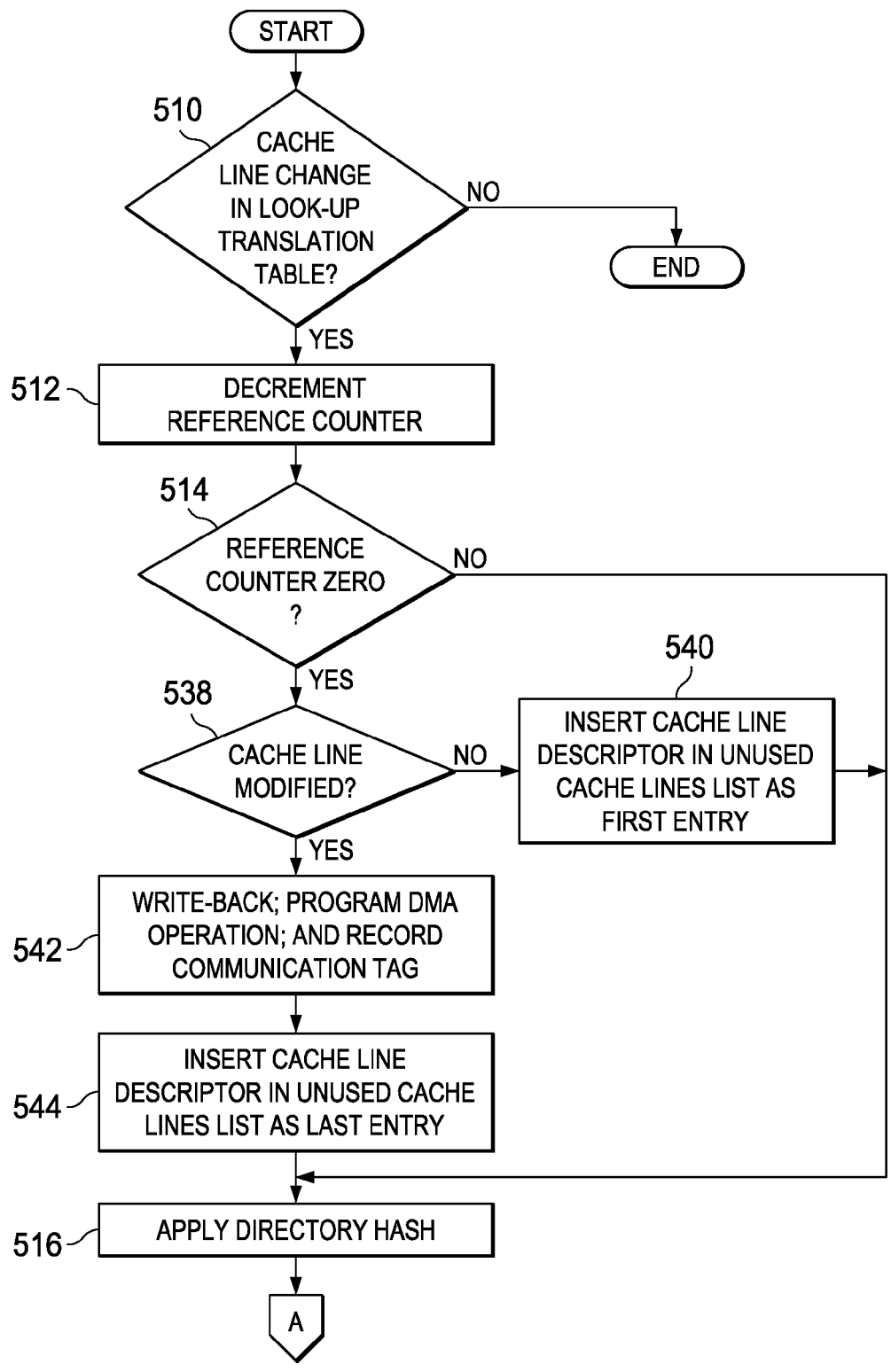
Figure 5B:
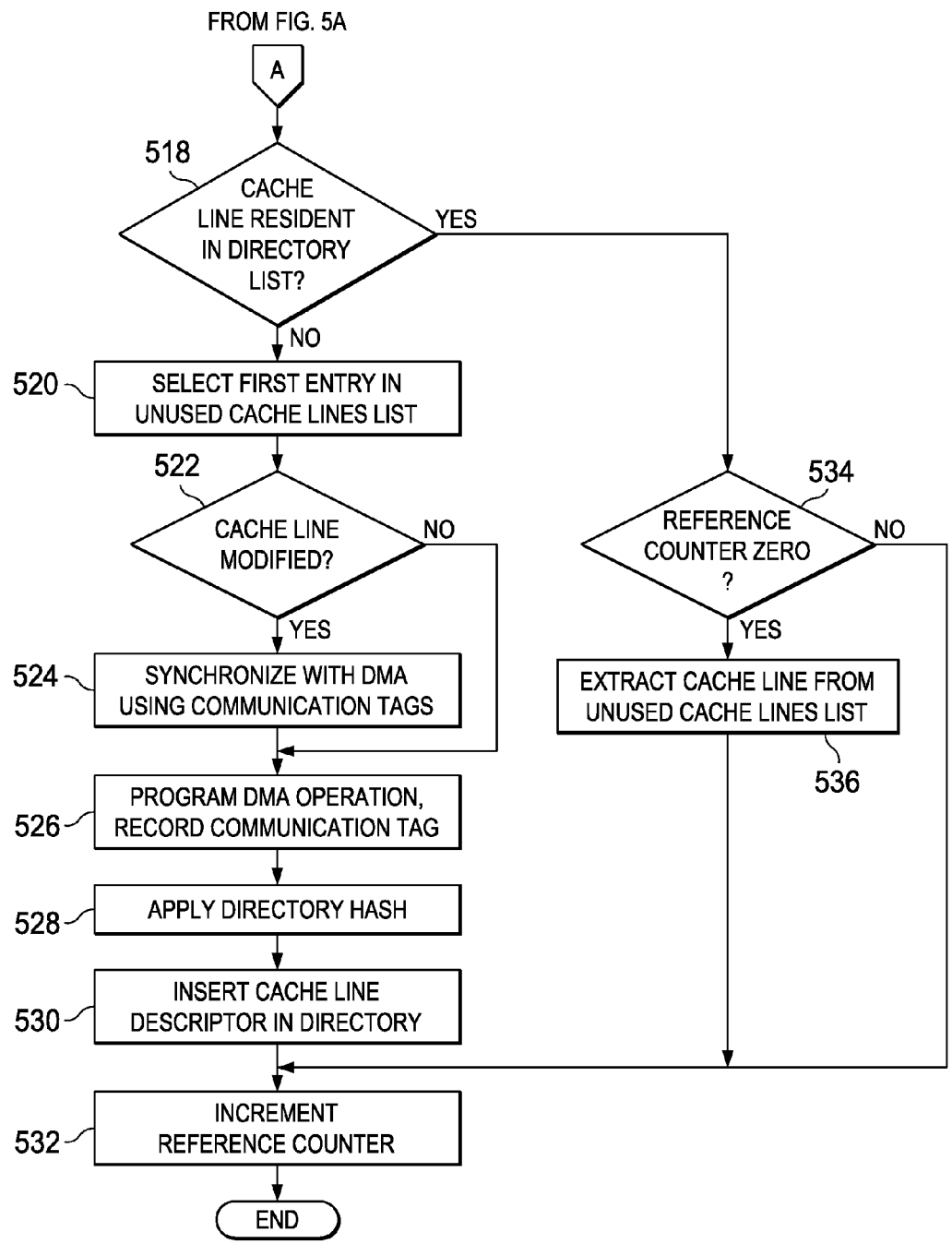

FIGS. 5A and 5B are a flowchart outlining an exemplary operation of the high locality cache in accordance with one illustrative embodiment. As shown in FIGS. 5A and 5B, the high locality cache operation begins by checking, in the look-up and translation table, a cache line referenced by an address associated with the memory access/reference to determine if the cache line associated with the address of the memory access/reference has been changed (step 510). This step corresponds to phase one of the look-up process for the high locality cache described previously above. If the cache line referenced by the memory access/reference has not changed, a hit occurred and thus, nothing more needs to be done. If the cache line has been changed, then the reference counter needs to be updated.

If the result of the check is positive, i.e. the cache line has been changed, then the reference counter in the cache line descriptor for the referenced cache line is decremented (step 512). A determination is then made as to whether the reference counter is zero (step 514). If the result of this determination is negative, i.e. the reference counter for the cache line is zero, then the cache line needs to be placed in the unused cache lines list with a possible write-back operation being performed. If the result of this determination is positive, i.e. the reference counter for the cache line is NOT zero, then the operation proceeds to the second phase of the look-up process previously discussed above.

If a change is detected, a directory hash is performed (step 516), to select one of the directory lists in the cache directory, the selected directory list is traversed, and a determination is made as to whether the cache line is resident in the selected directory list (step 518). If the cache line is not resident in the directory list, then a software cache miss has occurred and a first entry in the unused cache line list is selected for replacement (step 520). A determination is made as to whether the cache line corresponding to the first entry in the unused cache line list, i.e. the cache line was previously evicted (at a moment where its reference counter was zero) (step 522). If so, the cache line that was evicted is synchronized with the main memory, e.g., using the communication tags of the cache line descriptor of the cache line that was evicted (step 524). Thereafter, or if the cache line being evicted has not been modified, a DMA operation is programmed for moving the referenced missed cache line into the cache storage and a cache line descriptor for the cache line is generated/updated using the appropriate communication tags (step 526). A directory hash is applied to the base address of the cache line in main memory (step 528) and the cache line descriptor is inserted in the corresponding list in the cache directory (step 530). The reference counter in the cache line descriptor is then incremented (step 532) and the operation terminates.

If the cache line is resident in the directory list (step 518), then a software cache hit has occurred and determination is made as to whether the reference counter for the cache line, in the cache line descriptor, is zero (step 534). If the reference counter is zero, then the cache line is extracted from the unused cache lines list (step 536). Thereafter, or if the reference counter is not zero, then the operation continues to step 532 where the reference counter is incremented and the operation then terminates.

If the reference counter is zero in step 514, a determination is made as to whether the cache line no longer referenced by any regular memory access/reference has been modified (step 538). If the cache line has not been modified, the cache line descriptor for the cache line no longer referenced by any memory access/reference is inserted into the unused cache lines list as the first entry in the unused cache lines list (step 540). If the cache line no longer referenced by any memory access/reference has been modified, then a write-back operation is performed to synchronize the software cache with the main memory, a DMA operation is programmed for transferring the cache line data into main memory, and the communication tags for the DMA operation are recorded in the cache line descriptor for the cache line (step 542). The cache line descriptor is then inserted into the unused cache lines list as a last entry in the list (step 544). Thereafter, and after step 540, the operation continues to step 516.

Figure 6:
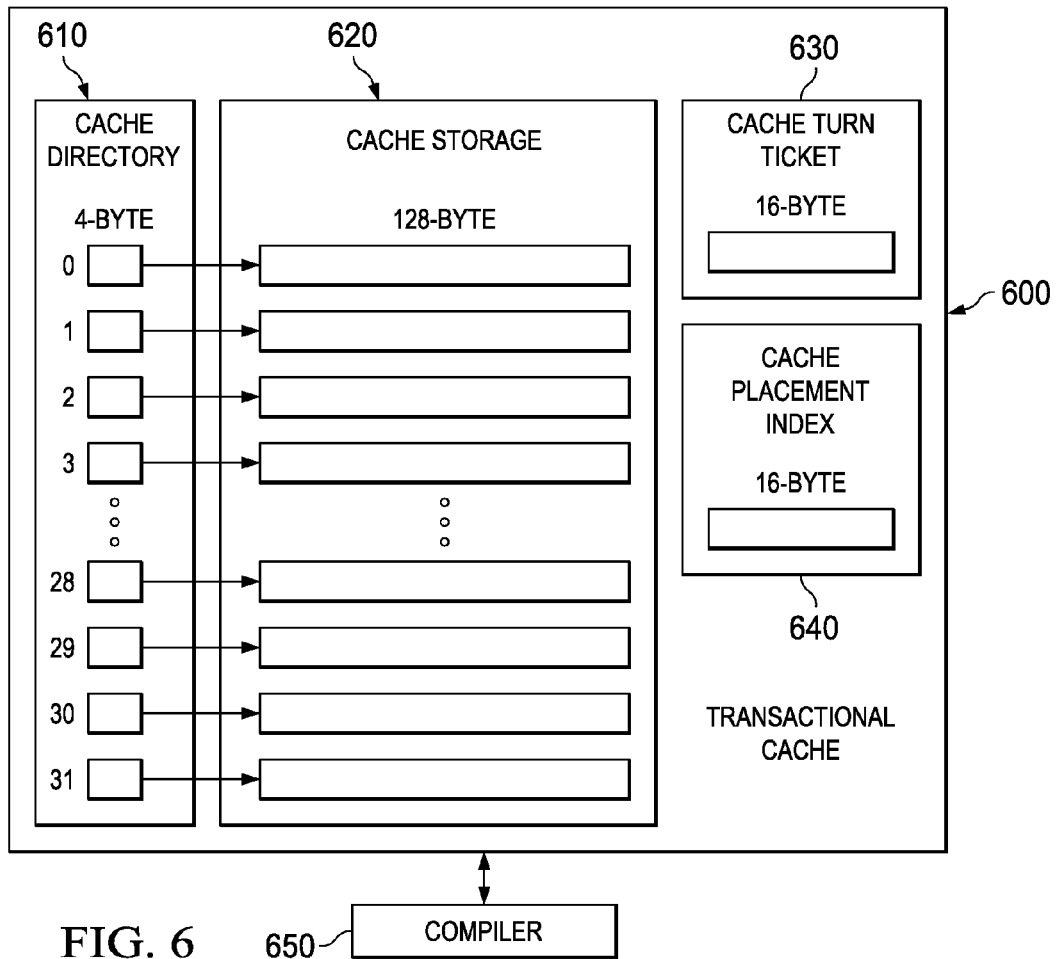

Thus, the mechanisms of the illustrative embodiments provide a software cache design architecture in which regular memory accesses/references are handled in an efficient manner based on their relatively high spatial locality. That is the high locality cache is used to handle these types of regular memory accesses/references in source code. The software cache design architecture of the illustrative embodiments, as shown in FIG. 3 above, further includes mechanisms for handling irregular memory accesses/references in source code. Specifically, the transactional cache 320 in FIG. 3 is used to treat irregular memory accesses/references, i.e. memory access/references that do no expose any type of locality. Contrary to the high locality cache 310, the transactional cache 320 is not designed to deliver acceptable hit/miss ratios but instead to deliver very low overheads and maximize the overlap between computation and communication. FIG. 6 is an exemplary block diagram of a transactional cache, such as transactional cache 320 in FIG. 3, in accordance with one illustrative embodiment. The transactional cache 600 supports relaxed consistency and avoids the use of dirty bits and atomic DMA transfers, used in known distributed memory systems, by forcing the implementation to a "write through" scheme where every write operation always updates both the transactional cache and the main memory.

As shown in FIG. 6, the transactional cache 600 comprises a cache directory data structure 610, a cache storage data structure 620, a cache turn ticket data structure 630, and a cache placement index data structure 640. These data structures may be stored in registers, one or more memories, or the like, associated with a compiler 650 that controls and utilizes these data structures when handling irregular memory accesses/references in executable code executed by a processor implementing the software cache design of the illustrative embodiments. The compiler 650 may be the same compiler 650 as compiler 340 in FIG. 3, for example.

The cache directory 610, in one illustrative embodiment, is organized as a vector of 32 entries of 4-byte values. Each entry stores the base address of the cache line stored in the cache storage 620. The entry index determines the cache line in the cache storage 620 to hold the cache line data. The cache directory 610 memory addresses may be aligned to a 16-byte boundary, for example.

The cache storage 620, in one illustrative embodiment, is organized as a 4 KB capacity fully associative cache with a cache line size of 128 bytes (32 cache lines). The cache storage 620 memory addresses may be aligned to a 128-byte boundary, for example. In another embodiment, the transactional cache 620 has a set associativity that is sufficiently high for the type of loop processed. Namely, in such an embodiment, a cache with a set associativity of SA can process any loops in which the number of references is smaller than SA.

The cache turn ticket 630, in one illustrative embodiment, is a 1-byte unsigned integer used as a counter. The cache turn ticket 630 may be stored in a 16-byte vector and aligned to a 16-byte boundary, for example.

The cache placement index 640, in one illustrative embodiment, is a 1-byte unsigned integer used to determine what cache line in the cache storage 620 has to be used to serve the next software cache miss. The cache placement index 640 may be stored in a 16-byte vector and aligned to a 16-byte boundary, for example.

An operational model of a transactional cache 600, such as transaction cache 600, in accordance with one illustrative embodiment, will now be described. A "transaction" is defined herein as a set of data transfers and related computations involving the following order of three phases. In a first phase, only transfers from main memory to the local storage, e.g., a local store of a SPU, are considered. In a second phase, computations in the transaction take place using the data that has been brought into the local storage by the associated data transfer. In a third phase, results generated by the computations in the second phase are sent back to the main memory. Transactions are not forced to include all of the three phases but instead are only forced to abide by the ordering of these three phases.

At the beginning of a transaction, the cache turn ticket 630 is incremented and masked with the value 0x0000001. This ensures that the value in the cache turn ticket 630 switches between 0 and 1 as long as transactions are executed. The value in the cache turn ticket 630 determines which entries have to be used in the cache storage 620 to hold the data required by the transaction. For example, for a cache turn ticket 630 having a value of 0, entries from 0 to 15 are used. For a cache turn ticket 630 having a value of 1, entries from 16 to 31 are used.

At the beginning of a transaction, the cache placement index 640 is set to 0 or 16, according to the value in the cache turn ticket 630. As long as the memory accesses/references are treated within a transaction, the cache placement index 640 is incremented for every memory access/reference that causes a software cache miss. Moreover, at the beginning of a transaction, only the cache directory 610 entries to be used in the transaction are nil-initialized.

The operational model for the transactional cache 600 is composed of all the operations that execute upon the transactional cache structures and implement the look-up, placement, communication, consistency, synchronization, and translation mechanisms. Each of these types of operations are described hereafter.

By default, the look-up process in the transactional cache 600 is forced to check for the data in the high locality cache. If a software cache hit occurs, the data is supplied from the high locality cache. If a software cache miss occurs in the high locality cache, then the transactional cache directory 610 is checked. It should be noted that, depending on the available information, it may be possible to avoid this double checking, e.g., if the data mapped to the transactional cache storage 620 is known to not be mapped in the cache storage of the high locality cache, only one look-up operation is necessary. The look-up code is efficiently implemented using single-instruction-multiple-data (SIMD) instructions. The look-up code, in one illustrative embodiment, comprises 8 comparison instructions, each of these instructions comparing 4 entries in the cache directory 610 with the address associated with the memory access/reference. Thus, all 32 entries in the cache directory 610 are checked using these 8 SIMD instructions.

The placement code may comprise incrementing a value of the cache placement index 640 which determines which cache line has to be used for holding the new incoming data. After incrementing the cache placement index 640, the cache placement index 640 is masked with 0x0000001f in order to ensure this value never exceeds 32. The cache line to be used for serving the next cache miss is taken from the value of the cache placement index 640 before the increment occurs.

The communication code is directly mapped to asynchronous data transfers, e.g., by performing MFC calls that program a DMA operation. For a load operation, this communication code is placed in the first phase of a transaction which involves a data transfer of 128 bytes. This first phase of the transaction is only executed if the look-up code determined that a software cache miss occurred. For store operations, this communication code is placed in the third phase of the transaction regardless of whether a software cache miss or a software cache hit occurred. Only the referenced datum in the store operation is transferred, not the whole cache line.

In order to ensure consistency within and across transactions, every DMA operation is tagged with an index of the cache line being used (from 0 to 31, for example), and a "fence" is placed right after the DMA operation, i.e. the MFC is not allowed to reorganize the DMA operations with the same tag. That is, those DMA operations referring to the same cache line cannot be reorganized due to the placement of the fence. Thus, the communication code for store operations are ordered as the store operations were originally coded and executed.

The write-back code is completely avoided by the illustrative embodiments. Neither dirty bits nor atomicity is required in the transactional cache implementation. In the third phase of the transaction, all modified data is sent back to main memory through the programming of a DMA operation as noted above. Thus, there is no need to maintain dirty bits or perform atomic DMA transfers of data from the software cache to the main memory.

The synchronizing code of every memory access/reference within a transaction is grouped in two different points. For load operations, the synchronize code is placed at the end of the first phase of the transaction. According to the cache turn ticket 630, the synchronizing code for load operations waits for DMA operations tagged with numbers 0 to 15 or 16 to 31, depending on which half of the 32 available cache lines are being used. For store operations, the synchronize code is placed at the beginning of the next transaction with the same value for the cache turn ticket, thereby synchronizing with the DMA operations tagged with numbers 0 to 15 or 16 to 31. Thus, the synchronization code only synchronizes with DMA transfers associated with one half of the total transactional cache storage 620 as determined by the cache turn ticket 630. This provides a double buffer effect.

The translation code for a load/store operation is composed of several arithmetic computations. First, the offset in the 128 byte cache line being referenced is computed by an AND operation using the mask 0x00000ff. The offset is then added to the base address of the cache line in the cache storage 620 pointed out by the placement code for the load/store operation. In this way, the address for the portion of the cache line referenced by the memory access/reference is generated by the translation code.

Figure 7A:
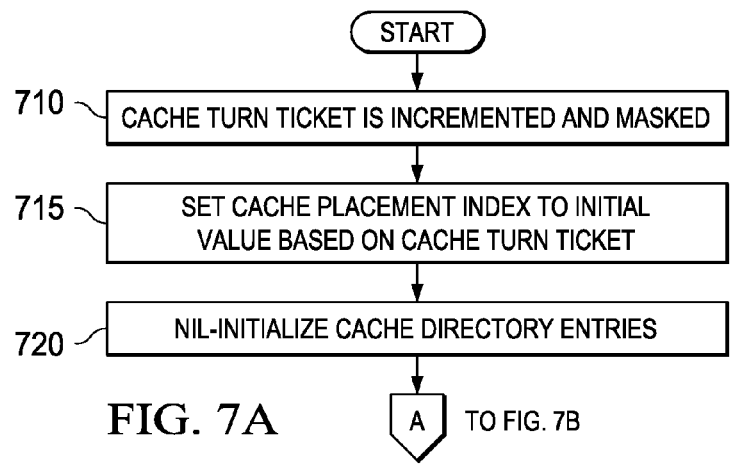
Figure 7B:
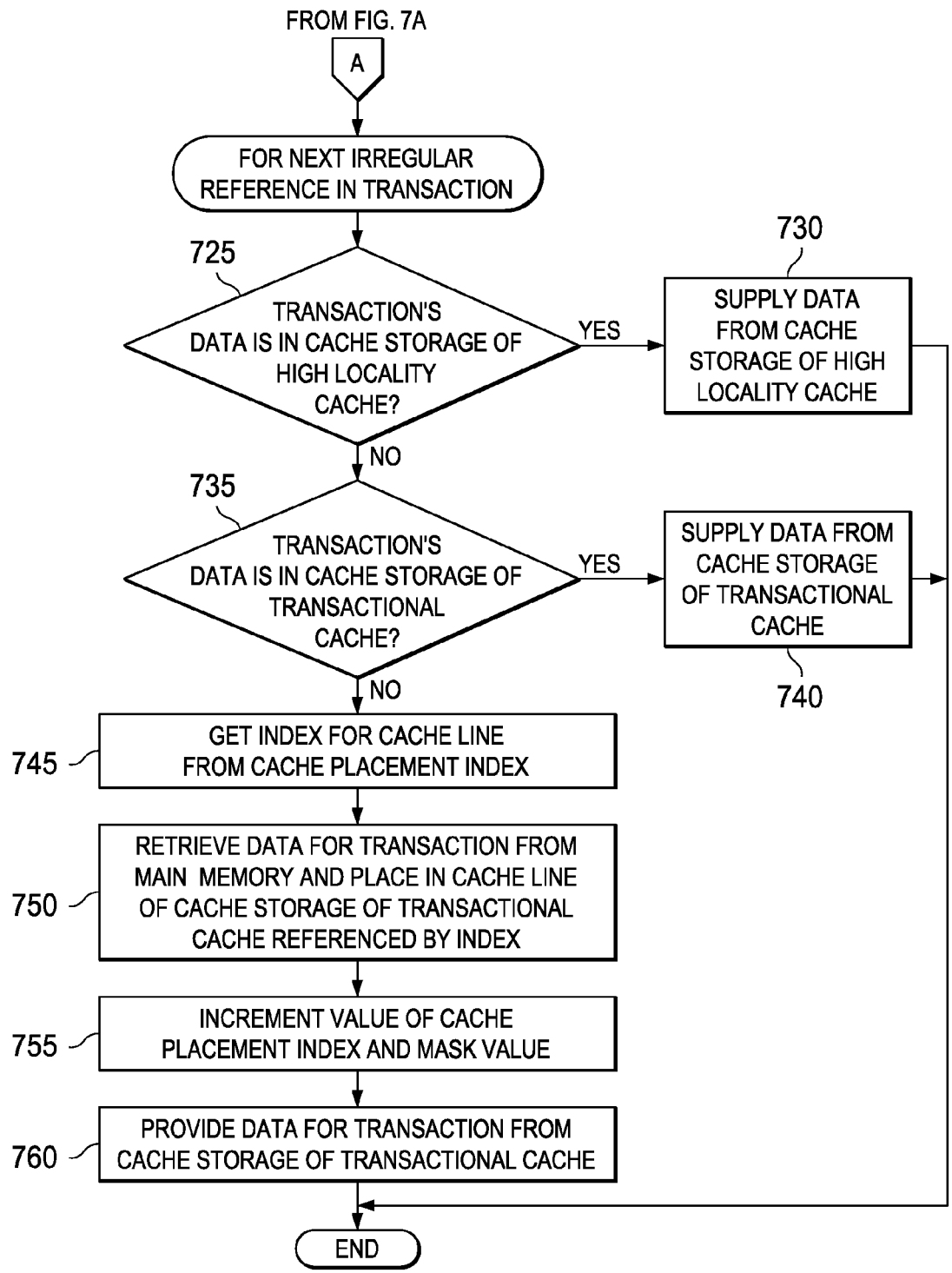

FIGS. 7A and 7B are a flowchart outlining an exemplary operation of a transactional cache in accordance with one illustrative embodiment. It should be appreciated that the operations shown in FIG. 7A are performed once per transaction. The operations shown in FIG. 7B are performed are performed once per irregular reference within a transaction. As shown in FIG. 7A, at the beginning of a transaction, the cache turn ticket is incremented and masked (step 710). Based on the cache turn ticket value, the cache placement index is set to an initial value, e.g., 0 or 16 (step 715). The cache directory entries are nil-initialized (step 720).

For a next irregular reference within the transaction, a look-up operation is performed in the high locality cache to determine if the data corresponding to the transaction is present in the cache storage of the high locality cache (step 725). If the data is present in the cache storage of the high locality cache, then the data is supplied from this cache storage (step 730). If the data is not present in the cache storage of the high locality cache, then the transactional cache directory is checked to see if the data referenced in the transaction is present in the cache storage of the transactional cache (step 735). If the data is not present in the transactional cache's cache storage, then a placement operation is performed. If the data is present in the cache storage of the transactional cache, then the data may be returned from the cache storage (step 740). Alternatively, a placement operation may be performed as if a cache miss occurred and the data may be copied in to a newly allocated cache line.

The placement operation may comprise identifying the present value of the cache placement index as the index for the cache line to be used for serving the cache miss (step 745). The data corresponding to the transaction may then be retrieved from main or system memory and placed in the cache line of the cache storage of the transactional cache referenced by the index value of the cache placement index (step 750). The placement operation may then comprise incrementing the value of the cache placement index and then masking the value (step 755). The data may then be provided for use by the transaction from the cache storage of the transactional cache (step 760). The operation then terminates.

Having set forth the elements making up the software cache design of the illustrative embodiments, in a system in which this software cache design is utilized by the processors of the system, a complier may perform executable code generation on source code in such a manner as to exploit the efficiencies provided by the software cache design. Specifically, knowing that the software cache mechanisms operate in the manner discussed above and have the above architecture, the compiler may perform code transformations and inject code into original computer source code so as to take advantage of these software cache mechanisms to generate more efficiently executable code.

For example, the complier may target the execution of loops in the source code and is based on whether memory accesses/references in these loops are classified as regular or irregular memory accesses/references. The compiler may parse the original source code, or an intermediate representation of this source code, for a loop and determine if memory accesses/references in the loop have a constant stride within the loop execution or not. Regular memory accesses/references may be determined to be those memory accesses/references in the loop that have a constant stride within the loop execution. All other memory accesses/references may be considered to be irregular memory accesses/references. As mentioned above, regular memory accesses/references are mapped to the high locality cache of the software cache design while irregular memory accesses/references are mapped to the transactional cache.

Figure 8:
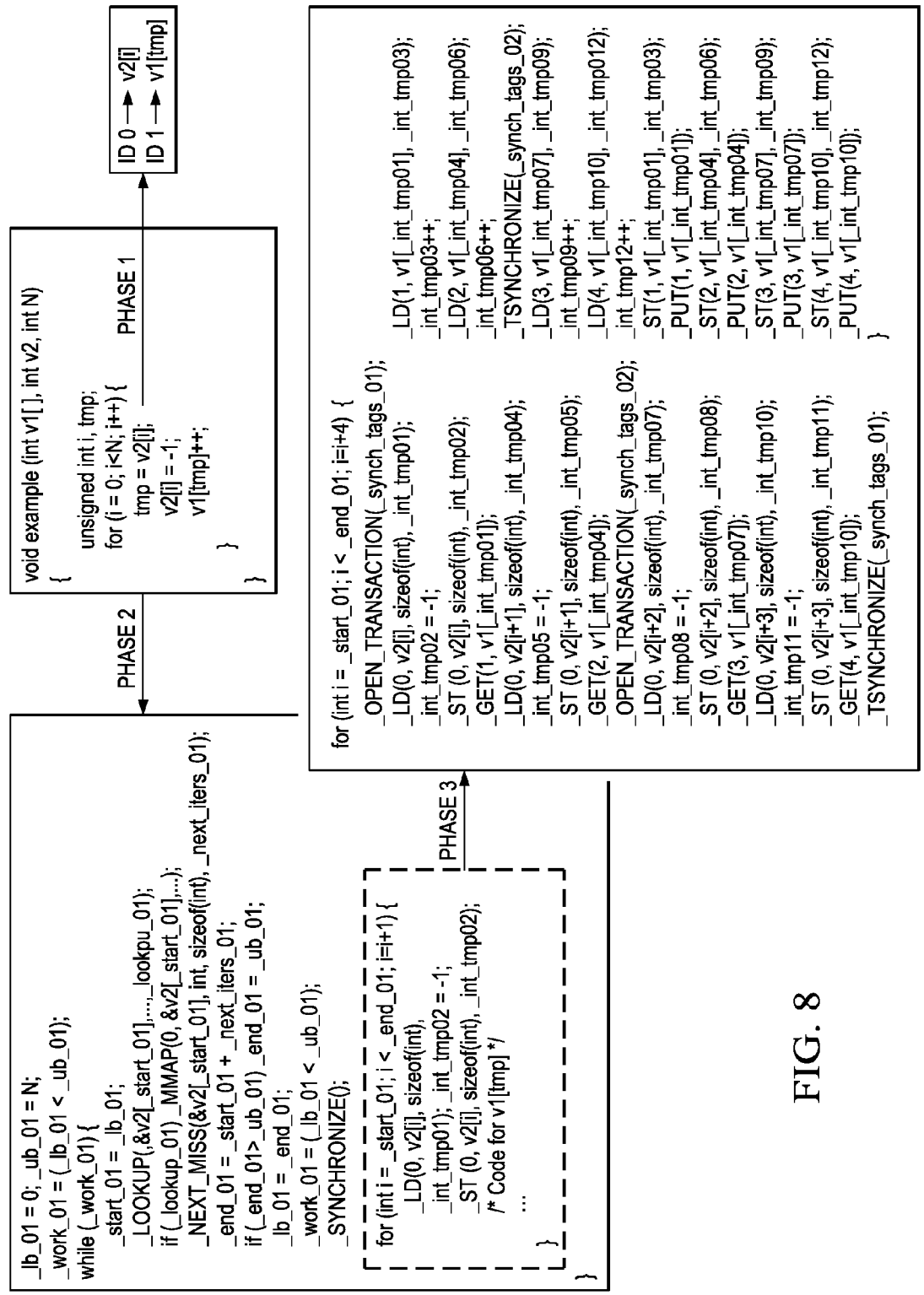

The code generation by the compiler may comprise three different phases. FIG. 8 is an exemplary diagram of an executable code generation by a compiler in accordance with one illustrative embodiment. As shown in FIG. 8, in a first phase, memory accesses/references within the loop are classified as regular or irregular in the manner previously described. Every regular memory access/reference may be identified with an associated integer value ranging from zero up to the number of regular memory accesses/references in the loop minus 1 (since the integer values start at zero). This identifier is used as an index to access the cache look-up and translation table of the high locality cache during the look-up process of the high-locality cache operational model. In the depicted example, a first memory reference $v2[i]$ is assigned the identifier 0 and a second memory reference $v1[tmp]$ is assigned the identifier 1.

In a second phase, the compiler transforms the loop into a nest of two loops that basically perform a dynamic sub-chunking of the iteration space of the original loop, i.e. splitting the original iteration space into smaller "chunks", the number of which and their sizes are determined dynamically at runtime. The definition of every chunk is done according to the changes of referenced cache lines on all regular memory references.

As shown in FIG. 8, during the second phase, the compiler has introduced a "while" loop responsible for the sub-chunking. Variables _lb_01 and _ub_01 hold the lower and upper bounds of the loop. At the beginning of the "while" loop's body, for every regular memory reference a set of four statements has been introduced: a call to _LOOKUP function, an if statement that conditionally executes _MMAP function, a call to _NEXT_MISS function, and finally a call to _UPDATE_MEM_CONSISTENCY.

The _LOOKUP function checks if the cache line referenced in the memory access is causing a change of cache line, according to the content of the look-up and translation table (this matches phase one in the look-up process discussed above). In case a change has been produced, the _MMAP function decrements the reference counter of the recently unreferenced cache line and, if the result is equal to zero, a write-back operation is executed. After that, the directory is accessed to determined if the cache line change produced a software cache miss or a software cache hit. In case a software cache miss occurs, the placement policy is applied and the corresponding data transfer is programmed asynchronously. In both cases, the reference counter of the recently referenced cache line is incremented.

The function _NEXT_MISS is responsible for computing the number of iterations that can be done for a particular memory access without changing the cache line. Consecutive executions of this function always keeps the minimum value for all the checked memory accesses. The dynamic sub-chunking is controlled by the _NEXT_MISS function, defining the chunks of iterations according to the iterations where a regular memory reference is going to change the cache line. It should be noted that not all regular memory references are going to change cache lines at the same iteration and that a change of a cache line does not imply a cache miss.

The function _UPDATE_MEM_CONSISTENCY is responsible for operating, through the memory consistency engine 330 in FIG. 3, to update the data structures responsible for the memory consistency, e.g., dirty bits and the like. Since the number of iterations for the next chunk has been computed by the _NEXT_MISS function, it is possible to compute which elements are going to be modified in the chunk execution for the regular memory accesses. The function _SYNCHRONIZE blocks the execution and waits until all data transfers associated with the software cache miss have completed. The original loop appears now with an iteration space defined by the sub-chunking process (variables _start_ 01 and _end_ 01). The memory accesses have been replaced by the _LD and _ST functions which are responsible for the corresponding address translation and actual memory access.

Finally, during this second phase, the compiler selects an appropriate cache line size. In a case where all regular memory references in a loop point to different cache lines, the selected cache line size needs to ensure that all of them will succeed in allocating a cache line. In accordance with one illustrative embodiment, it should be noted that for a cache line size of 512 bytes, the compiler is able to treat 128 memory references. In case the loop presents more than 128 regular memory references, then only 128 are treated as actual regular memory references with the reset being mapped in to the transactional cache.

In a third phase, the compiler applies transaction code generation at only the basic block level. It is not considered a code reorganization that attempts to deal with control flow dependencies and thus, the compiler is only allowed to introduce transactions within a basic block. The code generation described with regard to this third phase is based on the following defined operations. The _OPEN_TRANSACTION operation is responsible for initializing the cache data structures for a transaction. The output of this function is a range of tags to be used by all the data transfers within the transaction about to execute. The _GET operation is responsible for the look-up, placement, and the communication code for bringing one cache line into the transactional cache storage. The _PUT operation is responsible for transferring one datum in the transactional cache storage to main memory. The _TSYNCHRONIZE operation is responsible for the synchronization code, according to the output of the _OPEN_TRANSACTION operation.

FIG. 8 shows, in the third phase, the code generation for transactions. In order to increase the number of memory operations, the loop has been unrolled. Without losing any accuracy, the loop, in this example, is unrolled four times to simplify the explanations of the code structure. A larger unroll degree could be selected if necessary. In the same direction, only the resulting loop is showed, not the epilogue where the remaining iterations should be executed in case the number of iterations is not multiple of the unroll degree. Two transactions are defined, each one composed by two references to v1[tmp].

Figure 9:
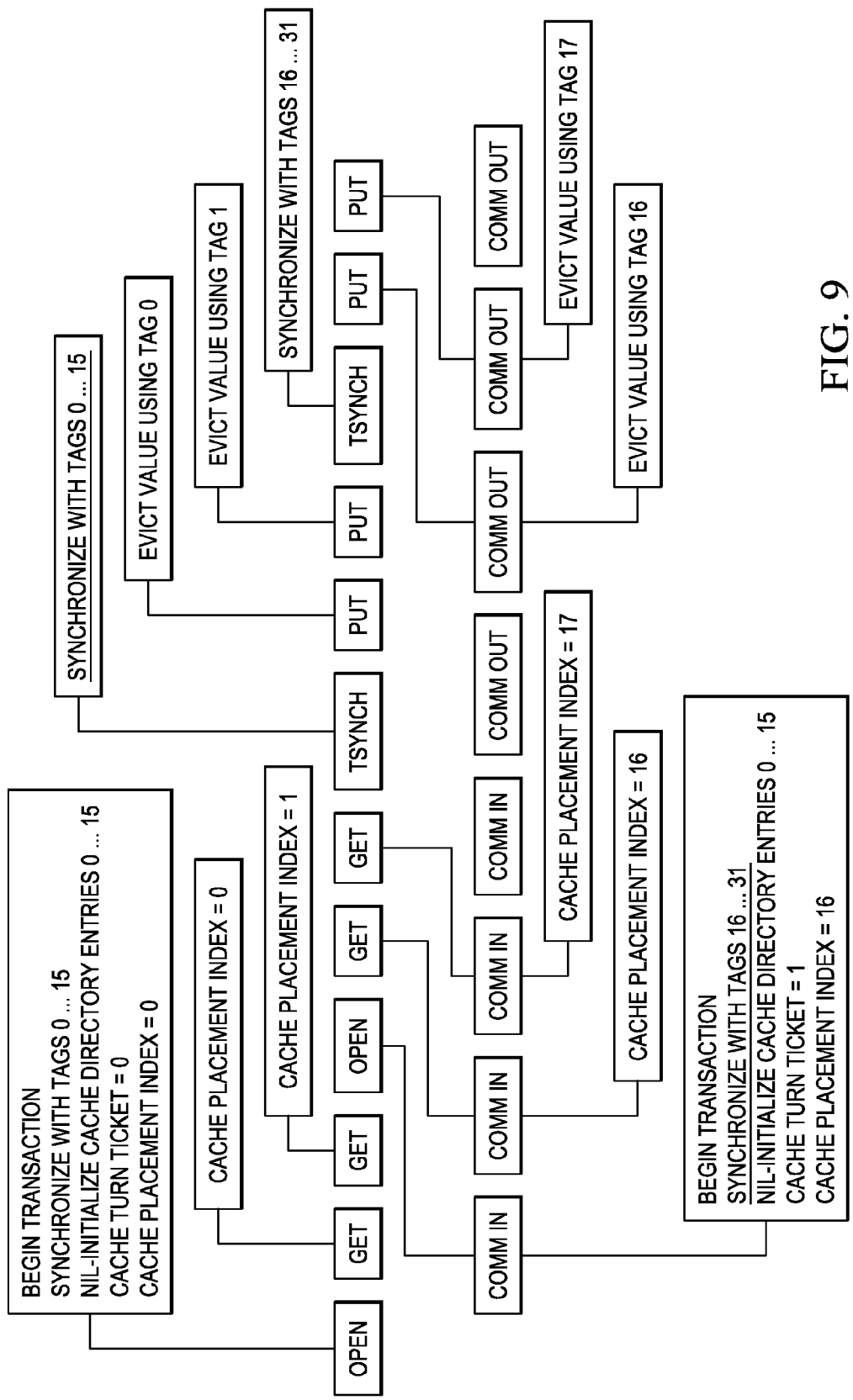

FIG. 9 is an exemplary diagram illustrating how the transactional cache structures are modified along one iteration of the unrolled loop of FIG. 8. Only the code devoted to the cache operations is shown for simplicity of the explanation. With reference to FIG. 9, initially, the cache turn ticket is supposed to be zero with each transaction being mapped to one half of the total transactional cache storage.

A first transaction is mapped to entries from 0 to 15 in the transactional cache storage. The two _GET operations are placed in entries 0 and 1, respectively. Tags 0 and 1 are assigned for the corresponding data transfers. The second transaction is defined and its two _GET operations are mapped to entries 16 and 17 respectively. Tags 16 and 17 are assigned to the corresponding data transfers. It has been assumed that both references missed in the transactional cache storage. It should be noted that the synchronization for the first transaction is going to synchronize with communications tagged with tags in the range [0 ... 15]. The second transaction will synchronize with communications tagged in the range [16 ... 31]. Notice that the synchronization code for first transaction is delayed by the introduction of code for the second transaction. With that, it is possible to diminish the number of lost cycles waiting for data. Similarly, the computation for the first transaction delays the execution of the synchronization code for the second transaction, causing the same effect.

The first transaction evicts the modified data using tags 0 and 1. The second transaction executes similarly, but using tags 16 and 17. It should be noted that when another iteration begins, before any transaction is defined, it has to be ensured that all evicted data is already in main memory. At the beginning of each transaction, a synchronization operation is performed with all possible pending data transfers tagged with tags corresponding to the cache lines in the half assigned to the transaction. In the example, the first transaction synchronizes with tags [0 ... 15], but again, between the communication code that used those tags in the previous iteration and the current synchronization point, the compiler has been able to place the evicted code for transaction two. Similarly, the definition of the first transaction executes between the initial synchronization of the second transaction and the evicted code that used the same tags that are going to be used in the second transaction.

The memory consistency engine contains the necessary data structures to maintain a relaxed consistency model. For every cache line in the high locality cache 310, information about what data has been modified is maintained using a dirty bits data structure. Whenever a cache line has to be evicted, the write-back operation or process is performed which comprises three steps. First, the cache line in the main memory is read. A merge operation is then applied between the cache line in the software cache storage and the cache line in recently transferred from main memory. The output of the merge is then sent back to the main memory. All data transfers of this type are synchronous and atomic.

Figure 10:
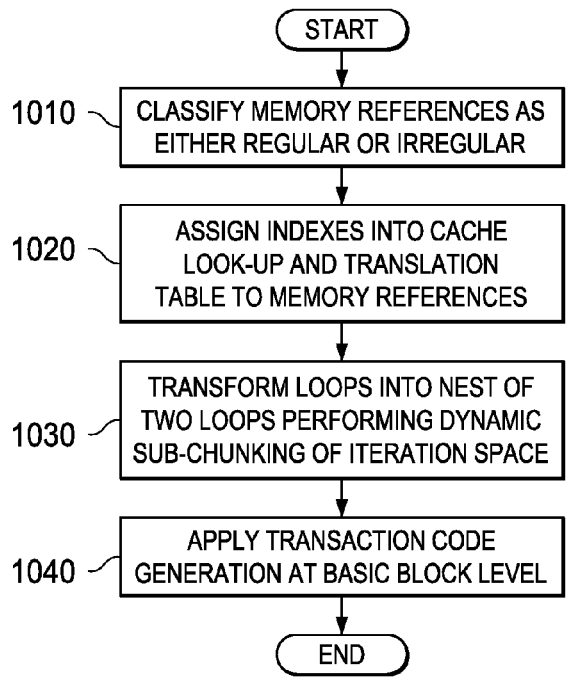

FIG. 10 is a flowchart outlining an exemplary operation of a compiler in accordance with one illustrative embodiment. As shown in FIG. 10, the compiler first classifies memory references of the original computer code into either a regular or irregular class of memory references (step 1010). Regular memory references are assigned indexes into the cache look-up and translation table (step 1020). Loops in the original computer code are transformed into a nest of two loops performing dynamic sub-chunking of the original iteration space of the loop (step 1030). Transaction code generation is then applied at the basic block level of these loops (step 1040) and the operation terminates.

Thus, the illustrative embodiments provide a software cache design and mechanisms of a software cache for handling memory access/references based on whether or not the memory accesses/references have a high spatial locality, i.e. are regular memory accesses/references with a constant stride. With the software cache design set forth above, the amount of transferred data, and the cache line sizes, are adapted according to the type of memory access, i.e. regular or irregular. Moreover, with the use of the software cache design, a compiler is allowed to reorganize the source code to maximize the chances for the overlapping of computation with communication. Such reorganization may group all the look-up, placement, and communication code and may place it as far as possible from the actual use of the data and the synchronization before the data is used.

It should be appreciated that while the above description refers to specific sizes and numbers of elements, this description is only exemplary and is not intended to set forth or imply any limitations with regard to these elements. For example, various memory sizes, cache sizes, numbers of cache lines, etc. are set forth above with regard to illustrative embodiments, however the present invention is not limited to these sizes or numbers. To the contrary, these are only exemplary and are used to facilitate an understanding of the invention rather than specifying any limitations of the present invention. Other sizes and numbers of the various elements set forth above with regard to the illustrative embodiments may be used without departing from the spirit and scope of the present invention.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for optimizing regular memory references in computer code, comprising:
    parsing the computer code to identify memory references in the computer code;
    classifying the memory references in the computer code as either regular memory references or irregular memory references, wherein accesses to a software cache by regular memory references are controlled by a high locality cache mechanism and accesses to a software cache by irregular memory references are controlled by a transaction cache mechanism;
    transforming the computer code, by a compiler, to generate transformed computer code in which irregular memory references access a storage of a software cache of the data processing system through the transactional cache mechanism of the software cache; and
    mapping, by the compiler, irregular memory references to the transactional cache mechanism by injecting explicit control code into the computer code to direct software cache access through the transactional cache mechanism, wherein regular memory references are memory references with high spatial locality and have a constant strided access pattern, and wherein irregular memory references are memory references that do not expose a high spatial locality or constant strided access pattern.

2. The method of claim 1, wherein the transactional cache mechanism comprises a cache directory data structure, a cache storage data structure, a cache turn ticket data structure, and a cache placement index data structure.

3. The method of claim 2, wherein:
    the cache directory comprises a plurality of entries, each entry storing a base address of a cache line stored in the cache storage, and wherein each entry's index determines a cache line in the cache storage to hold cache line data,
    the cache turn ticket data structure stores a counter value that identifies one of a first set of entries in the cache storage or a second set of entries in the cache storage to be used to store data required by a transaction, and
    the cache placement index data structure stores a value used to determine what cache line in the cache storage has to be used to serve a next software cache miss.

4. The method of claim 2, wherein the transactional cache mechanism, in response to receiving a memory reference in the transformed computer code, performs a transaction comprising at least two of:
    a first phase involving transfers of data from system memory to a local storage device;
    a second phase involving performing computations using the data that has been brought into the local storage device in the first phase or is present in the software cache; or
    a third phase involving sending results of the computations in the second phase back to the system memory.

5. The method of claim 4, wherein performing a transaction comprises:
    incrementing, at a beginning of the transaction, a value stored in the cache turn ticket data structure;
    nil-initializing, at the beginning of the transaction, cache directory entries to be used in the transaction;
    performing a look-up process in a high locality cache storage associated with the high locality cache mechanism to determine if data required by the transaction is stored in the high locality cache storage; and
    obtaining the data required by the transaction from the high locality cache storage if the required data is present in the high locality cache storage.

6. The method of claim 5, wherein performing a transaction further comprises:
    in response to a determination that the required data is not present in the high locality cache storage, comparing a first address generated by the memory reference with addresses of entries in the cache directory; and
    obtaining the data required by the transaction from an entry in the cache storage corresponding to an entry in the cache directory having a matching address to the first address if the first address matches an address of an entry in the cache directory.

7. The method of claim 6, wherein if the first address does not match an address of an entry in the cache directory, performing the transaction further comprises:

obtaining an index value for a cache line of the cache storage of the transactional cache mechanism from the cache placement index data structure;

retrieving data required by the transaction from system memory;

placing the retrieved data in a cache line of the cache storage of the transactional cache mechanism corresponding to the index value;

incrementing the value stored in the cache placement index data structure; and providing the retrieved data for use in performing computations of the transaction.

8. The method of claim 4, wherein communication code for obtaining data from system memory is placed in the first phase of the transaction for load operations and is executed only if data required by the transaction is not present in the cache storage of the transactional cache mechanism, and wherein communication code for obtaining data from system memory is placed in the third phase of the transaction for store operations.

9. The method of claim 1, wherein the method is implemented in a heterogeneous multiprocessor system having a control processor and a plurality of controlled processors.

10. A computer program product comprising a computer recordable storage device having a computer readable program recorded thereon, wherein the computer readable program, when executed on a computing device, causes the computing device to:

parse computer code to identify memory references in the computer code;

classify the memory references in the computer code as either regular memory references or irregular memory references, wherein accesses to a software cache by regular memory references are controlled by a high locality cache mechanism and accesses to a software cache by irregular memory references are controlled by a transaction cache mechanism;

transform the computer code, by a compiler, to generate transformed computer code in which irregular memory references access a storage of a software cache of the data processing system through the transactional cache mechanism of the software cache; and map, by the compiler, irregular memory references to the transactional cache mechanism by injecting explicit control code into the computer code to direct software cache access through the transactional cache mechanism, wherein regular memory references are memory references with high spatial locality and have a constant strided access pattern, and wherein irregular memory references are memory references that do not expose a high spatial locality or constant strided access pattern.

11. The computer program product of claim 10, wherein the transactional cache mechanism comprises a cache directory data structure, a cache storage data structure, a cache turn ticket data structure, and a cache placement index data structure.

12. The computer program product of claim 11, wherein:

the cache directory comprises a plurality of entries, each entry storing a base address of a cache line stored in the cache storage, and wherein each entry's index determines a cache line in the cache storage to hold cache line data, the cache turn ticket data structure stores a counter value that identifies one of a first set of entries in the cache storage or a second set of entries in the cache storage to be used to store data required by a transaction, and the cache placement index data structure stores a value used to determine what cache line in the cache storage has to be used to serve a next software cache miss.

13. The computer program product of claim 11, wherein the transactional cache mechanism, in response to receiving a memory reference in the transformed computer code, performs a transaction comprising at least two of:

a first phase involving transfers of data from system memory to a local storage device;

a second phase involving performing computations using the data that has been brought into the local storage device in the first phase or is present in the software cache; or a third phase involving sending results of the computations in the second phase back to the system memory.

14. The computer program product of claim 13, wherein performing a transaction comprises:

incrementing, at a beginning of the transaction, a value stored in the cache turn ticket data structure;

nil-initializing, at the beginning of the transaction, cache directory entries to be used in the transaction;

performing a look-up process in a high locality cache storage associated with the high locality cache mechanism to determine if data required by the transaction is stored in the high locality cache storage; and obtaining the data required by the transaction from the high locality cache storage if the required data is present in the high locality cache storage.

15. The computer program product of claim 14, wherein performing a transaction further comprises:

in response to a determination that the required data is not present in the high locality cache storage, comparing a first address generated by the memory reference with addresses of entries in the cache directory; and obtaining the data required by the transaction from an entry in the cache storage corresponding to an entry in the cache directory having a matching address to the first address if the first address matches an address of an entry in the cache directory.

16. The computer program product of claim 15, wherein if the first address does not match an address of an entry in the cache directory, performing the transaction further comprises:

obtaining an index value for a cache line of the cache storage of the transactional cache mechanism from the cache placement index data structure;

retrieving data required by the transaction from system memory;

placing the retrieved data in a cache line of the cache storage of the transactional cache mechanism corresponding to the index value;

incrementing the value stored in the cache placement index data structure; and providing the retrieved data for use in performing computations of the transaction.

17. The computer program product of claim 13, wherein communication code for obtaining data from system memory is placed in the first phase of the transaction for load operations and is executed only if data required by the transaction is not present in the cache storage of the transactional cache mechanism, and wherein communication code for obtaining data from system memory is placed in the third phase of the transaction for store operations.

18. An apparatus, comprising:

a processor; and a memory coupled to the processor, wherein the memory comprises instructions which, when executed by the processor, cause the processor to:

parse computer code to identify memory references in the computer code;

classify the memory references in the computer code as either regular memory references or irregular memory references, wherein accesses to a software cache by regular memory references are controlled by a high locality cache mechanism and accesses to a software cache by irregular memory references are controlled by a transaction cache mechanism; and transform the computer code, by a compiler, to generate transformed computer code in which irregular memory references access a storage of a software cache of the data processing system through the transactional cache mechanism of the software cache; and map, by the compiler, irregular memory references to the transactional cache mechanism by injecting explicit control code into the computer code to direct software cache access through the transactional cache mechanism, wherein regular memory references are memory references with high spatial locality and have a constant strided access pattern, and wherein irregular memory references are memory references that do not expose a high spatial locality or constant strided access pattern.

* * * * *